(12) United States Patent
Kwak et al.

(10) Patent No.: US 11,357,377 B2
(45) Date of Patent: Jun. 14, 2022

(54) ROBOT CLEANER AND A CONTROLLING METHOD FOR THE SAME

(71) Applicant: LG ELECTRONICS INC., Seoul (KR)

(72) Inventors: Donghoon Kwak, Seoul (KR); Kyoungsuk Ko, Seoul (KR); Sungwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 16/508,487

(22) Filed: Jul. 11, 2019

(65) Prior Publication Data

US 2020/0077861 A1 Mar. 12, 2020

Related U.S. Application Data

(60) Provisional application No. 62/727,562, filed on Sep. 6, 2018.

(30) Foreign Application Priority Data

Feb. 1, 2019 (KR) .......................... 10-2019-0014053

(51) Int. Cl.
*A47L 11/40* (2006.01)
*G05D 1/02* (2020.01)

(52) U.S. Cl.
CPC ....... *A47L 11/4011* (2013.01); *A47L 11/4061* (2013.01); *G05D 1/0289* (2013.01);
(Continued)

(58) Field of Classification Search
CPC ...... A47L 11/24; A47L 11/40; A47L 11/4002; A47L 11/4005; A47L 11/4011;
(Continued)

(56) References Cited

U.S. PATENT DOCUMENTS 5,819,008 A  10/1998  Asama et al.
5,825,981 A * 10/1998  Matsuda .......... G05B 19/41845
                                                 700/248
(Continued)

FOREIGN PATENT DOCUMENTS

CN  103522304  1/2014
CN  104997461  10/2015
(Continued)

OTHER PUBLICATIONS

Taiwanese Office Action, dated May 28, 2021, issued in Taiwanese Patent Application No. 108128347.
(Continued)

*Primary Examiner* — Bhavesh V Amin
(74) *Attorney, Agent, or Firm* — Birch, Stewart, Kolasch & Birch, LLP

(57) ABSTRACT

A cleaning system may include a first mobile robot, a communication unit configured to communicate with a second mobile robot that emits a second signal, and a controller configured to recognize the location of the second mobile robot using the second signal, and control a moving speed of the first mobile robot such that the second mobile robot follows a trajectory corresponding to the movement of the first mobile robot based on the recognized location. The controller may transmit a first signal to the second mobile robot in response to the first mobile robot approaching the second mobile robot to within a distance less than a threshold distance from the second mobile robot, and control avoidance moving of the first mobile robot and the second mobile robot based on the second signal of the second mobile robot responding to the first signal.

17 Claims, 34 Drawing Sheets

(52) U.S. Cl.
CPC ........ *G05D 1/0295* (2013.01); *A47L 2201/04* (2013.01); *G05D 2201/0203* (2013.01)

(58) Field of Classification Search
CPC ............. A47L 11/4061; A47L 11/4091; A47L 2201/022; A47L 2201/04; A47L 11/28; A47L 2201/00; A47L 2201/02; A47L 9/28; A47L 9/2894; A47L 11/18; A47L 11/4066; A47L 9/00; A47L 9/009; A47L 9/2852; B25J 13/086; B25J 13/089; B25J 9/1682; B25J 9/0084; B25J 9/1666; G05D 1/0088; G05D 1/0227; G05D 1/024; G05D 1/0242; G05D 1/0246; G05D 1/0255; G05D 1/0257; G05D 1/0268; G05D 2201/0203; G05D 1/0287; G05D 1/0289; G05D 1/0293; G05D 1/0295; G05D 1/0225; G05D 1/0278; G05D 1/0291; G05D 2201/0215; G05D 1/0027; G05D 1/0219; G05D 1/0223; G05D 1/0236; G05D 1/0238; G05D 1/0251; G05D 1/0272; G05D 1/0276; G05D 2201/0201; G05D 2201/0204; A01B 69/008; B60W 30/09; B60W 30/0953; B60W 30/0956; G08G 1/166
See application file for complete search history.

(56) References Cited

U.S. PATENT DOCUMENTS

| | | | | |
|---|---|---|---|---|
| 6,374,155 B1* | 4/2002 | Wallach | ............... | G05D 1/0274 700/245 |
| 6,496,755 B2* | 12/2002 | Wallach | ............... | G05D 1/0274 700/245 |
| 7,054,716 B2* | 5/2006 | McKee | ............... | G05D 1/0251 318/568.1 |
| 8,496,078 B2* | 7/2013 | Wellborn | ............. | G05D 1/0234 180/14.2 |
| 8,627,908 B2* | 1/2014 | Wellborn | ............... | B62D 59/04 180/14.2 |
| 8,755,936 B2* | 6/2014 | Friedman | ............... | G08C 17/00 700/248 |
| 8,918,950 B2 | 12/2014 | Song et al. | | |
| 9,687,131 B2 | 6/2017 | Eidmohammadi et al. | | |
| 9,924,699 B2 | 3/2018 | Wisse et al. | | |
| 10,602,898 B2* | 3/2020 | Scholten | ............. | A47L 11/4011 |
| 2004/0073337 A1* | 4/2004 | McKee | ............... | G05D 1/0251 700/245 |
| 2004/0204804 A1 | 10/2004 | Lee et al. | | |
| 2006/0106496 A1 | 5/2006 | Okamoto | | |
| 2006/0293794 A1* | 12/2006 | Harwig | ................ | G05D 1/0261 700/253 |
| 2007/0050937 A1* | 3/2007 | Song | ....................... | A47L 9/009 15/319 |
| 2012/0193153 A1* | 8/2012 | Wellborn | ............. | B60W 10/20 180/14.2 |
| 2013/0060401 A1 | 3/2013 | Hahne | | |
| 2014/0124004 A1* | 5/2014 | Rosenstein | ............. | G06T 7/246 134/18 |
| 2015/0297052 A1* | 10/2015 | Eidmohammadi | .. | G05D 1/0225 134/18 |
| 2017/0113342 A1 | 4/2017 | Abramson | | |
| 2017/0332868 A1* | 11/2017 | Nam | ......................... | A47L 9/04 |
| 2018/0092499 A1* | 4/2018 | Strazisar | ................... | A47L 9/30 |
| 2018/0181143 A1 | 6/2018 | Hiramatsu | | |
| 2018/0192845 A1* | 7/2018 | Gu | ....................... | A47L 11/4061 |
| 2018/0361569 A1* | 12/2018 | Hackert | .............. | H04L 12/2816 |
| 2020/0081453 A1 | 3/2020 | Kwak | | |
| 2020/0081454 A1 | 3/2020 | Kwak | | |
| 2020/0081456 A1 | 3/2020 | Kwak | | |

FOREIGN PATENT DOCUMENTS

| | | |
|---|---|---|
| CN | 105686766 | 6/2016 |
| CN | 205942412 | 2/2017 |
| CN | 206473273 | 9/2017 |
| CN | 107479544 | 12/2017 |
| CN | 206850525 | 1/2018 |
| CN | 108420371 | 8/2018 |
| JP | 2005192609 | 7/2005 |
| JP | 2006146491 | 6/2006 |
| JP | 2010015194 A | 1/2010 |
| JP | 2010235080 | 10/2010 |
| JP | 4639253 | 12/2010 |
| JP | 2015160022 | 9/2015 |
| KR | 10-1155500 B1 | 6/2012 |
| KR | 10-2011-0100712 | 9/2012 |
| KR | 10-2014-0112824 | 9/2014 |
| KR | 10-2016-0063140 | 6/2016 |
| KR | 10-2016-0070467 | 6/2016 |
| KR | 10-2016-0133348 | 11/2016 |
| KR | 10-2017-0090631 | 8/2017 |
| KR | 10-2018-0031153 A | 3/2018 |
| KR | 10-2018-0048705 | 5/2018 |
| TW | 201722336 | 1/2017 |
| TW | 1654961 B | 4/2019 |
| WO | WO2017036532 A1 | 3/2017 |

OTHER PUBLICATIONS

PCT Notification of Transmittal of the International Search Report and the Written Opinion of the International Search Authority dated Nov. 18, 2019.
Korean Office Action, dated Sep. 11, 2020, issued in Korean Patent Application No. 10-2019-0020081 (6 pages).
Office Action in U.S. Appl. No. 16/562,678, dated Oct. 28, 2021.
Examination Report No. 1 for Australian Application No. 2019334724 dated Oct. 27, 2021.
Taiwanese Office Action, dated Jul. 7, 2021, issued in Taiwanese Patent Application No. 108131942.
U.S. Notice of Allowance for U.S. Appl. No. 16/562,678, dated Apr. 7, 2022.

* cited by examiner

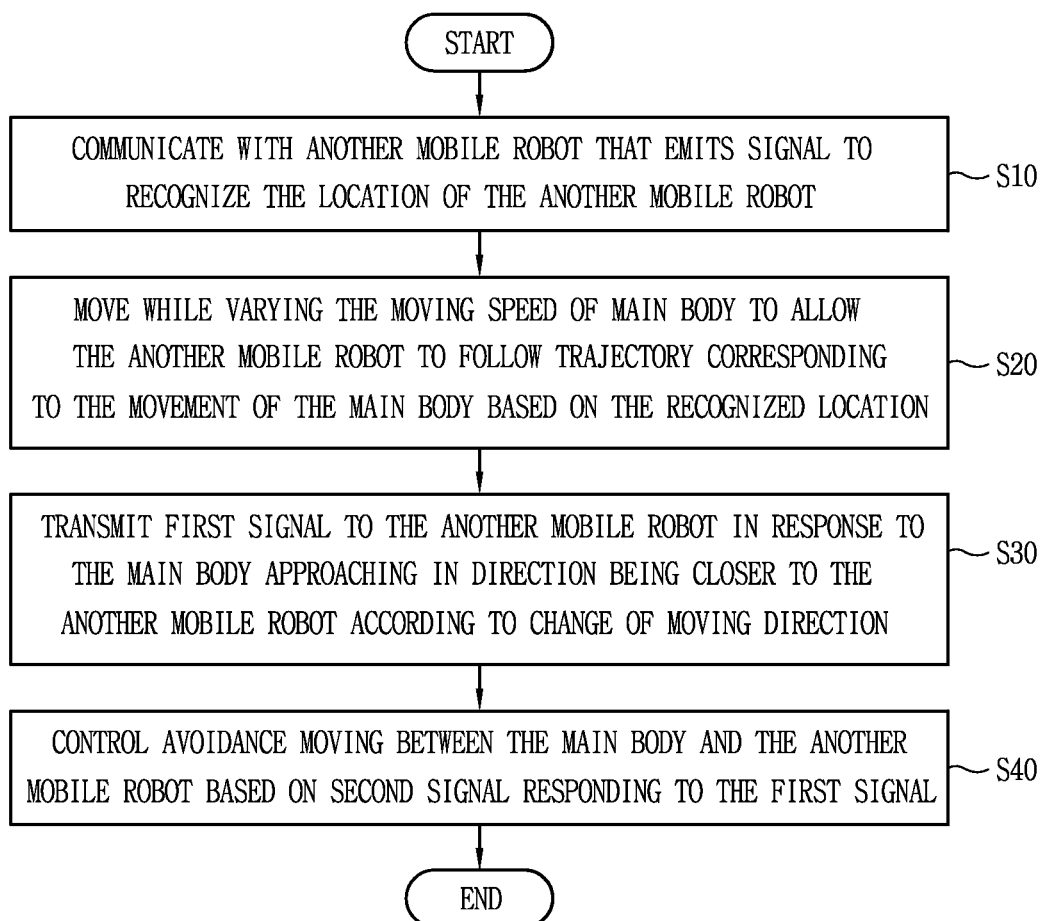

ROBOT CLEANER AND A CONTROLLING METHOD FOR THE SAME

CROSS-REFERENCE TO RELATED APPLICATIONS

Pursuant to 35 U.S.C. § 119(a), this application claims the benefit of earlier filing date and right of priority to U.S. Provisional Application No. 62/727,562 filed on Sep. 6, 2018, and Korean Application No. 10-2019-0014053, filed on Feb. 1, 2019, the contents of which are incorporated by reference herein in their entireties.

BACKGROUND OF THE INVENTION

1. Field of the Invention

The present disclosure relates to a plurality of mobile robots that autonomously move while any one thereof follows another one thereof.

2. Description of the Conventional Art

Generally, a mobile robot is a device that automatically performs a predetermined operation while moving by itself in a predetermined area without a user's operation. The mobile robot senses obstacles located in the area and performs its operations by moving close to or away from such obstacles.

Such mobile robot may include a robot cleaner that performs cleaning while moving in an area. The robot cleaner is a robot cleaner that performs cleaning while moving by itself without user's operation.

In this manner, with the development of such a robot cleaner performing cleaning while moving by itself without a user's operation, there is a need to develop a plurality of robot cleaners for performing cleaning while any one thereof follows another one thereof or while collaborating with each other without a user's operation.

The prior art document WO2017-036532 discloses a method in which a master robot cleaner (hereinafter, referred to as a master robot) controls at least one slave robot cleaner (hereinafter, referred to as a slave robot).

The prior art document discloses a configuration in which the master robot detects adjacent obstacles by using an obstacle detection device and determines its position related to the slave robot using position data derived from the obstacle detection device.

In addition, the prior art discloses a configuration in which the master robot and the slave robot perform communication with each other via a server using wireless local area network (WLAN) technology.

According to the prior art document, the master robot can determine the position of the slave robot but the slave robot cannot determine the position of the master robot.

Further, in order for the slave robot to determine (decide) the position of the master robot using the configuration disclosed in the prior art document, the master robot must transmit relative position information regarding the slave robot determined by the master robot to the slave robot through the server.

However, the prior art fails to disclose such a configuration in which the master robot transmits relative position information to the slave robot via the server.

In addition, even if it is assumed that the master robot transmits relative position information, the master robot and the slave robot should perform communication only through the server. Accordingly, such communication with the server may be disconnected when the master robot or the slave robot is located at a place where it is difficult to communicate with a server.

In this case, since the slave robot is unable to receive relative position information from the server, the slave robot is unable to know the position of the master robot. As a result, there may arise a problem that follow-up or collaboration among a plurality of robot cleaners is not efficiently performed.

Furthermore, the robot cleaner changes its moving direction several times while moving to clean a designated cleaning space. For example, it is often required to change a current moving direction frequently changes depending on a shape of a cleaning space, a moving mode of the robot cleaner, detection of an obstacle, a topographic characteristic of the floor, and the like.

In case where one of the plurality of robot cleaners performs collaborative cleaning while any one thereof follows another one thereof, when a head cleaner changes its moving direction, a follower cleaner is positioned in front of the leading cleaner, thereby causing a problem that the front and rear positions thereof are reversed.

Moreover, when the head cleaner and the follower cleaner approach in a direction of being closer to each other, it is required to design optimal avoidance moving for various situations.

Such problems are similarly occurred among a plurality of mobile robots capable of performing a specific function (e.g., air conditioning function, etc.) while moving by themselves without a user's operation. Specifically, in case where any one of the plurality of mobile robots follows another one thereof while collaborating with each other, when a leading mobile robot changes its moving direction such that the leading mobile robot and the following mobile robot are close to each other, the design of avoidance moving for each situation will be required.

SUMMARY OF THE INVENTION

Accordingly, an object of the present disclosure is to provide a mobile robot capable of moving while any one of a plurality of mobile robots follows a moving path of another one thereof with no interference or collision with each other without going through a server, and a control method thereof.

Furthermore, another object of the present disclosure is to provide a mobile robot that can be controlled to perform flexible follow-up without any interruption when any one of a plurality of mobile robots follows another one thereof, and a control method thereof.

In addition, still another object of the present disclosure is to provide a mobile robot capable of controlling follow-up moving of a following mobile robot on the basis of a length of a trajectory to be actually followed by the following mobile robot during follow-up of a plurality of mobile robots so as to perform efficient follow-up control without collision or delay even in an exceptional situation where the moving directions of the leading mobile robot and the following mobile robot are different or they should avoid each other, and a control method thereof.

Besides, yet still another object of the present disclosure is to provide a mobile robot capable of allowing visually stable follow-up control as well as allowing a collision-free and error-free avoidance design with a following mobile robot even when a leading mobile robot changes its current moving direction during follow-up of a plurality of mobile robots, and a control method thereof.

Moreover, yet still another object of the present disclosure is to provide a plurality of mobile robots capable of continuously performing efficient follow-up without any interference of the following mobile robot later even when the leading mobile robot changes its moving direction and is temporarily located behind the following mobile robot, and a control method thereof.

In the present disclosure, a plurality of mobile robots may transmit and receive signals from each other to determine relative positions, thereby recognizing that the leading mobile robot changes its moving direction to gradually approach the following mobile robot.

Furthermore, the moving speeds of a plurality of mobile robots may be controlled based on a length of the movement trajectory of the leading mobile robot to be followed by the following mobile robot, thereby implementing uninterrupted and flexible follow-up moving.

In addition, when it is recognized that the leading mobile robot changes its moving direction to gradually approach the following mobile robot, an avoidance moving operation may be carried out in such a manner that the leading mobile robot transmits a move command to the following mobile robot, thereby allowing the leading mobile robot to maintain a planned moving path without being disturbed by the following robot.

Besides, in order to maintain a follow-up relationship while the leading mobile robot is moving on a planned moving path, the following mobile robot may be implemented to perform a motion for following the trajectory of the leading mobile robot at a moved position.

Moreover, when the following mobile robot is unable to move according to a surrounding situation, the leading mobile robot may be implemented to perform an avoidance moving operation that moves while temporarily getting out of a planned moving path to avoid the following mobile robot.

To this end, a mobile robot according to an embodiment of the present disclosure may include a driving unit configured to move a main body; a communication unit configured to communicate with another mobile robot that emits a signal; and a controller configured to recognize the location of the another mobile robot using the signal, and control a moving speed of the main body such that the another mobile robot follows a trajectory corresponding to the movement of the main body based on the recognized location, wherein the controller transmits a first signal to the another mobile robot in response to the main body approaching the another mobile robot in a direction of being close to the another mobile robot according to a change of the moving direction, and controls the avoidance moving of the main body and the another mobile robot based on a second signal of the another mobile robot responding to the first signal.

Furthermore, according to an embodiment, the controller may control the first signal to be transmitted while reducing a moving speed of the main body when the main body approaches the another mobile robot to be close thereto within a predetermined range.

Furthermore, according to an embodiment, the controller may output a control command to stop the moving of the main body while the another mobile robot moves away from the main body based on the second signal.

Furthermore, according to an embodiment, the controller may control to reduce the moving speed of the main body according to the first signal, and maintain the reduced moving speed while the another mobile robot moves away from the main body based on the second signal.

Furthermore, according to an embodiment, avoidance moving based on the second signal may be carried out when the main body moves in a direction away from the another mobile robot subsequent to the movement of the another mobile robot and ends at the time when a signal emitted from the another mobile robot is sensed at the rear side of the main body.

Furthermore, according to an embodiment, when avoidance moving based on the second signal ends, the controller may output a control command to stop the moving of the main body such that the another mobile robot follows a trajectory corresponding to the movement of the main body prior to the avoidance moving.

Furthermore, according to an embodiment, the controller may control the another mobile robot to perform a rotational motion that searches for a location to move based on the second signal, and output a control command to stop the moving of the main body while the rotational motion is carried out.

Furthermore, according to an embodiment, the controller may control the driving unit such that the main body moves without deviating from a current moving path in response to whether the other mobile robot has moved away from the main body according to the avoidance moving.

Furthermore, according to an embodiment, the controller may control avoidance moving such that the main body moves in a direction away from the another mobile robot in response to whether information indicating an unavoidable state of the another mobile robot is included in the second signal.

Furthermore, according to an embodiment, when the main body performs avoidance moving away from the another mobile robot based on the second signal, the controller may restrict the another mobile robot not to follow a trajectory corresponding to the avoidance moving of the main body based on the second signal.

Furthermore, according to an embodiment, when the main body performs avoidance moving away from the another mobile robot based on the second signal, the controller may control the another mobile robot to perform a rotational motion for following a trajectory corresponding to the movement of the main body at a current location during avoidance moving.

Furthermore, according to an embodiment, the controller may stop the moving of the main body in response to whether information indicating an unavoidable state of the another mobile robot is included in the second signal, and control the another mobile robot to move a current moving path while controlling the another mobile robot to move in a direction away from the main body until moving out of the moving path of the main body.

In addition, a method of controlling a mobile robot may include communicating with another mobile robot that emits a signal to allow a mobile robot body to recognize the location of the another mobile robot; allowing the another mobile robot to follow and move a trajectory corresponding to the movement of the main body based on the recognized location of the another mobile robot; allowing the main body to transmit a first signal to the another mobile robot in response to the main body approaching the another mobile robot in a direction of being close to the another mobile robot according to a change of the moving direction of the main body; and controlling the avoidance moving of the main body and the mobile robot based on a second signal of the another mobile robot in response to the first signal.

Furthermore, according to an embodiment, said transmitting the first signal may be transmitting the first signal while reducing a moving speed of the main body when the main body approaches the another mobile robot to be close thereto within a predetermined range.

Furthermore, according to an embodiment, said controlling the avoidance moving may include outputting a control command to stop the moving of the main body while the another mobile robot moves away from the main body based on the second signal.

Furthermore, according to an embodiment, said controlling the avoidance moving may include controlling to reduce the moving speed of the main body according to the first signal, and maintain the reduced moving speed of the main body while the another mobile robot moves away from the main body based on the second signal.

Furthermore, according to an embodiment, said controlling the avoidance moving may allow the main body to move in a direction away from the another mobile robot subsequent to the movement of the another mobile robot and ends at the time when a signal emitted from the another mobile robot is sensed at the rear side of the main body.

Furthermore, according to an embodiment, the method may further include outputting a control command to stop the moving of the main body such that the another mobile robot follows a trajectory corresponding to the movement of the main body prior to avoidance moving when the avoidance moving based on the second signal ends.

As described above, according to a mobile robot and a control method thereof according to an embodiment of the present disclosure, a following mobile robot may move without any interruption while following a leading mobile robot without going through a server.

Furthermore, follow-up moving of the following mobile robot may be controlled on the basis of a length of a trajectory to be actually followed by the following mobile robot during follow-up of a plurality of mobile robots thereby performing efficient follow-up control without collision or delay even in an exceptional situation where the moving directions of the leading mobile robot and the following mobile robot are different or they should avoid each other, and a control method thereof.

In addition, a movement speed of the following mobile robot may be reduced or the trajectory of the leading mobile robot may be followed in place when a length of the trajectory to be followed by the following mobile robot is decreased, and a movement speed of a leading mobile robot may be reduced or stopped when a length of the trajectory to be followed by the following mobile robot is increased so as to allow the following mobile robot to follow the leading mobile robot without missing, thereby visually stable follow-up control.

Besides, during follow-up of a plurality of mobile robots, even when the leading mobile robot changes its current moving direction, collision and error-free avoiding design with the following mobile robot may be allowed, thereby allowing visually stable follow-up control.

Moreover, even when the leading mobile robot changes its moving direction and is temporarily located behind the following mobile robot, it may be possible to continuously perform efficient follow-up without any interference of the following mobile robot through an optimal avoidance design.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention. In the drawings:

FIG. 8 is a representative flowchart for explaining a method of controlling a mobile robot according to an embodiment of the present disclosure.

DETAILED DESCRIPTION OF THE PREFERRED EMBODIMENT

Hereinafter, a mobile robot according to the present disclosure will be described in detail with reference to the accompanying drawings.

Hereinafter, description will be given in detail of embodiments disclosed herein. Technical terms used in this specification are merely used for explaining specific embodiments, and should not be constructed to limit the scope of the technology disclosed herein.

First, the term "mobile robot" disclosed herein may be used as the same meaning as "robot (for a specific function)," "robot cleaner," "robot for cleaning" and "autonomous cleaner," and those terms will be used equally.

Furthermore, the term "a plurality of mobile robots" disclosed in the present disclosure may be used as "a plurality of robot cleaners" or "a plurality of cleaners". Furthermore, the term a "first mobile robot" may be named a "first robot", a "first robot cleaner", or a "first cleaner". Furthermore, the term a "second mobile robot" may be named a "second robot", a "second robot cleaner", or a "second cleaner".

Figure 1:
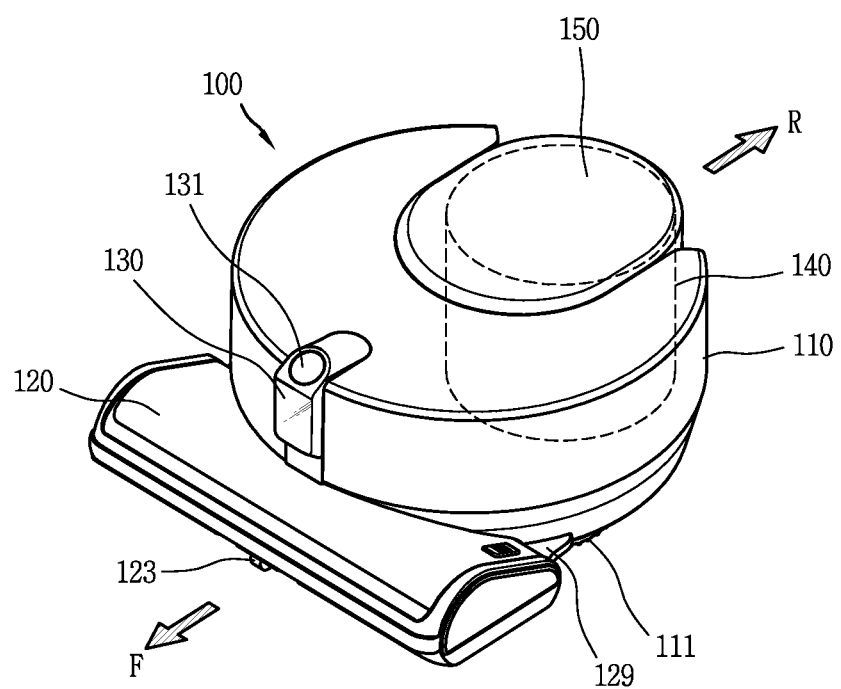
FIG. 1 is a perspective view showing an example of a mobile robot according to the present disclosure.
Figure 2:
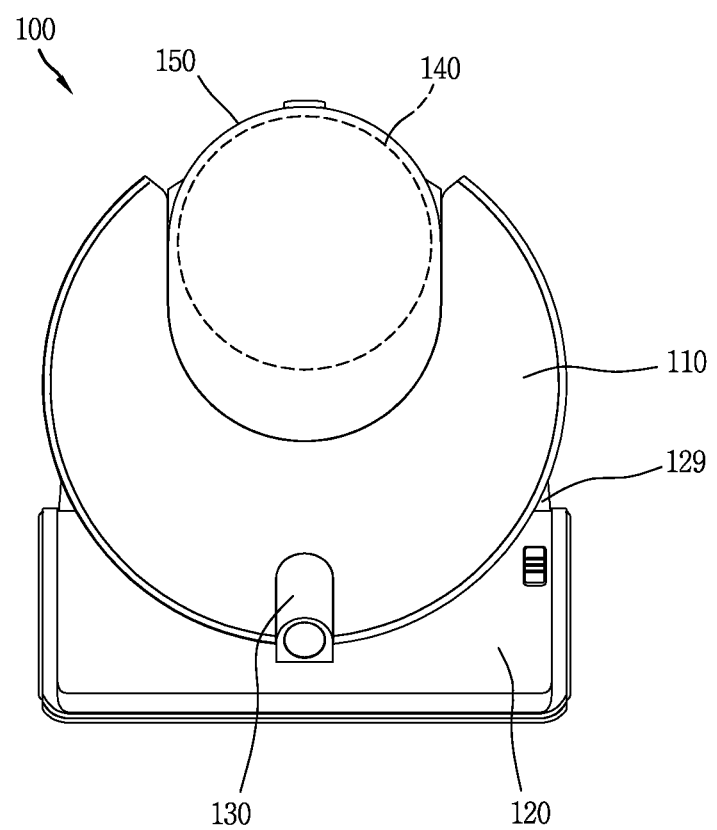
FIG. 2 is a plan view of the mobile robot illustrated in FIG. 1.
Figure 3:
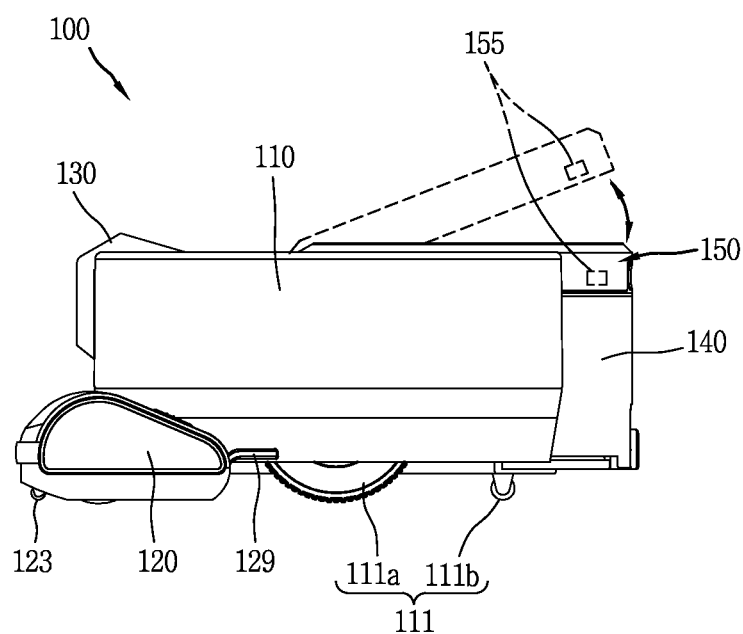
FIG. 3 is a side view of the mobile robot illustrated in FIG. 1.

FIGS. 1 to 3 illustrate a robot cleaner as an example of a mobile robot according to the present disclosure.

Specifically, FIG. 1 is a perspective view showing an example of a mobile robot 100 according to the present disclosure, and FIG. 2 is a plan view of the mobile robot 100 illustrated in FIG. 1, and FIG. 3 is a side view of the mobile robot 100 illustrated in FIG. 1.

In this specification, a mobile robot, a robot cleaner, and a cleaner that performs autonomous moving may be used in the same sense. Furthermore, in this specification, a plurality of cleaners described as an example of a plurality of mobile robots may include at least part of configurations illustrated in FIGS. 1 to 3.

Referring to FIGS. 1 through 3, the robot cleaner 100 performs a function of cleaning a floor while moving on a predetermined area by itself. Cleaning of a floor mentioned here includes sucking dust (including foreign matter) on the floor or mopping the floor.

The robot cleaner 100 may include a cleaner main body 110, a cleaning unit 120, a sensing unit 130, and a dust container 140.

The cleaner main body 110 is provided with various components in addition to a controller (not illustrated) for controlling the robot cleaner 100. In addition, the cleaner main body 110 is provided with a wheel unit 111 for the moving of the robot cleaner 100. The robot cleaner 100 may move forward, backward, leftward and rightward by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the control unit. Each of the main wheels 111a may be configured to be drivable independently from each other. For example, each main wheel 111a may be driven by a different motor. Or each main wheel 111a may be driven by a plurality of different axes provided in one motor.

The sub wheel 111b is configured to support the cleaner body 110 along with the main wheel 111a and assist the moving of the robot cleaner 100 by the main wheel 111a. The sub wheel 111b may also be provided on a cleaning unit 120 to be described later.

The controller is configured to control the driving of the wheel unit 111 in such a manner that the robot cleaner 100 autonomously moves on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

In FIG. 1, a cleaning unit 120 may be disposed in a protruding form from one side of the cleaner main body 110, so as to suck air containing dust or mop an area. The one side may be a side where the cleaner main body 110 moves in a forward direction (F), that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The vacant space is a space between both left and right end portions of the cleaner body 110 and both left and right end portions of the cleaning unit 120, and has a shape recessed in an inward direction of the robot cleaner 100.

When an obstacle is caught in the vacant space, the robot cleaner 100 may be blocked by an obstacle not to move. In order to prevent this, a cover member 129 may be disposed to cover at least part of the vacant space.

The cover member 129 may be provided on the cleaner main body 110 or the cleaning unit 120. According to the present embodiment, it is shown that the cover member 129 is formed in a protruding manner on both sides of a rear end portion of the cleaning unit 120, and disposed to cover an outer peripheral surface of the cleaner body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. In other words, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The castor 123 is configured to assist the moving of the robot cleaner 100, and also support the robot cleaner 100.

The cleaner main body 110 is provided with the sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 to sense an obstacle or geographic feature in front of the robot cleaner 100 so that the cleaning unit 120 positioned at the forefront of the robot cleaner 100 does not collide with the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the control unit. For example, the camera 131 may transmit an electrical signal corresponding to an upward image to the control unit. The electrical signal corresponding to the upward image may be used by the control unit to detect the position of the cleaner main body 110.

In addition, the sensing unit 130 may detect obstacles such as walls, furniture, and cliffs on a moving surface or a moving path of the robot cleaner 100. Also, the sensing unit 130 may sense presence of a docking device that performs battery charging. Also, the sensing unit 130 may detect ceiling information so as to map a moving area or a cleaning area of the robot cleaner 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. Dust is collected in the dust box 140, and air is discharged from the dust box 140 and then discharged to the outside through the discharge port 112 in the cleaner body 110 and finally through the discharge port 112.

An embodiment related to the components of the robot cleaner 100 will be described below with reference to FIG. 4.

The robot cleaner 100 or the mobile robot according to an embodiment of the present disclosure may include a communication unit 1100, an input unit 1200, a moving unit 1300, a sensing unit 1400, an output unit 1500, a power supply unit 1600, a memory 1700, a controller 1800, and a cleaning unit 1900, or a combination thereof.

Figure 4:
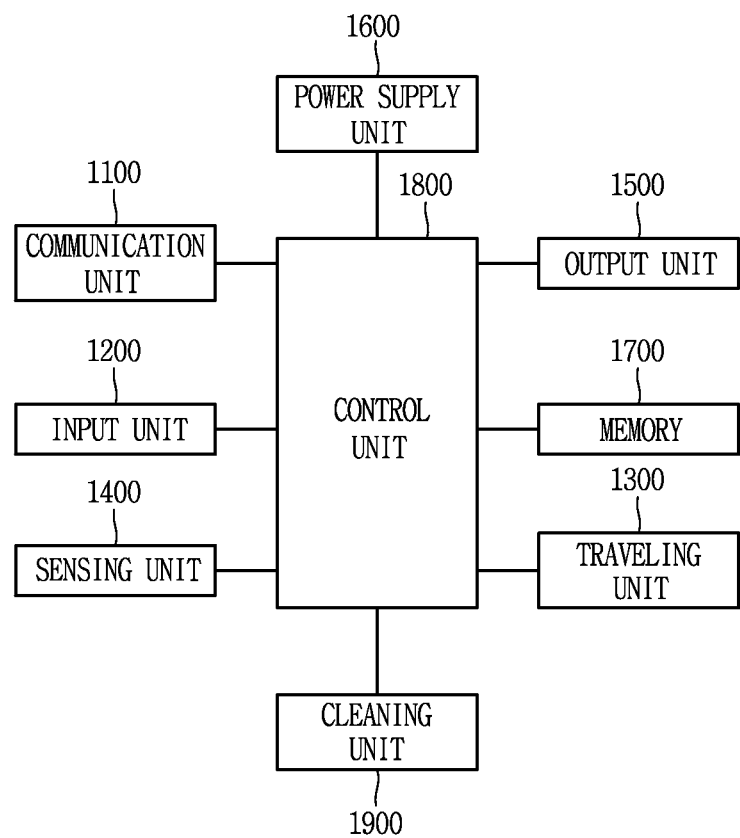
FIG. 4 is a block diagram showing exemplary components of a mobile robot according to an embodiment of the present disclosure.

Here, it is needless to say that the components shown in FIG. 4 are not essential, and thus a robot cleaner having more or fewer components than shown in FIG. 4 may be implemented. Also, as described above, each of a plurality of robot cleaners described in the present disclosure may equally include only some of components to be described below. In other words, a plurality of robot cleaners may include different components.

Hereinafter, each component will be described.

First, the power supply unit 1600 includes a battery that can be charged by an external commercial power source to supply power to the mobile robot. The power supply unit 1600 supplies driving power to each of the components included in the mobile robot to supply operating power required for the mobile robot to move or perform a specific function.

Here, the controller 1800 may sense the remaining power of the battery, and control the battery 1800 to move power to a charging base connected to the external commercial power source when the remaining power is insufficient, and thus a charge current may be supplied from the charging base to charge the battery. The battery may be connected to a battery sensing unit, and a battery remaining amount and a charging state may be delivered to the controller 1800. The output unit 1500 may display the remaining battery level under the control of the controller.

The battery may be located in a lower portion of the center of the robot cleaner or may be located at either one of the left and right sides. In the latter case, the mobile robot may further include a balance weight for eliminating a weight bias of the battery.

The controller 1800 performs a role of processing information based on an artificial intelligence technology and may include at least one module for performing at least one of learning of information, inference of information, perception of information, and processing of a natural language.

The controller 1800 may use a machine learning technology to perform at least one of learning, inference and processing of a large amount of information (big data), such as information stored in the cleaner, environment information around the cleaner, information stored in a communicable external storage, and the like. Furthermore, the controller 1800 may predict (or infer) at least one executable operation of the cleaner based on information learned using the machine learning technology, and control the cleaner to execute the most feasible operation among the at least one predicted operation.

The machine learning technology is a technology that collects and learns a large amount of information based on at least one algorithm, and determines and predicts information based on the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using a deep neural network (DNN) algorithm. The deep neural network (DNN) may have a structure of linking layers and transferring data between the layers. This deep learning technology may be employed to learn a vast amount of information through the deep neural network (DNN) using a graphic processing unit (GPU) optimized for parallel computing.

The controller 1800 may use training data stored in an external server or a memory, and may include a learning engine for detecting a characteristic for recognizing a predetermined object. Here, characteristics for recognizing an object may include the size, shape, and shade of the object.

Specifically, when the controller 1800 inputs a part of images acquired through the camera provided on the cleaner into the learning engine, the learning engine may recognize at least one object or organism included in the input images.

In this way, when the learning engine is applied to the moving of the cleaner, the controller 1800 may recognize whether or not there exists an obstacle that obstructs the moving of the cleaner, such as a chair leg, a fan, a specific type of balcony gap, or the like, thereby enhancing the efficiency and reliability of the moving of the cleaner.

On the other hand, the learning engine may be mounted on the controller 1800 or on an external server. When the learning engine is mounted on an external server, the control unit 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. Here, the information related to the recognition result may include information related to a number of objects, a name of each object, included in the image that is subjected to analysis.

On the other hand, the moving unit 1300 may include a motor, and operate the motor to bidirectionally rotate left and right main wheels, so that the main body can rotate or move. At this time, the left and right main wheels may be independently moved. The moving unit 1300 may advance the main body of the mobile robot forward, backward, left, right, curvedly, or in place.

Meanwhile, the input unit 1200 receives various control commands for the robot cleaner from the user. The input unit 1200 may include one or more buttons, for example, the input unit 1200 may include an OK button, a set button, and the like. The OK button is a button for receiving a command for confirming sensing information, obstacle information, position information, and map information from the user, and the set button is a button for receiving a command for setting the information from the user.

In addition, the input unit 1200 may include an input reset button for canceling a previous user input and receiving a user input again, a delete button for deleting a preset user input, a button for setting or changing an operation mode, a button for receiving a command to be restored to the charging base, and the like.

Furthermore, the input unit 1200, such as a hard key, a soft key, a touch pad, or the like, may be installed on an upper portion of the mobile robot. In addition, the input unit 1200 may have a form of a touch screen along with the output unit 1500.

On the other hand, the output unit 1500 may be installed on an upper portion of the mobile robot. Of course, the installation location and installation type may vary. For example, the output unit 1500 may display a battery state, a moving mode, and the like on the screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, and the like detected by the sensing unit 1400 on the screen. The output unit 1500 may be formed with any one of a light emitting diode (LED), a liquid crystal display (LCD), a plasma display panel, and an organic light emitting diode (OLED).

The output unit 1500 may further include a sound output device for audibly outputting an operation process or an operation result of the mobile robot performed by the controller 1800. For example, the output unit 1500 may output a warning sound to the outside in accordance with a warning signal generated by the controller 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure may output environment information on a moving area on the screen or output it as sound. According to another embodiment, the mobile robot may transmit map information or environment information to a terminal device through the communication unit 1100 to output a screen or sound to be output through the output unit 1500.

The memory 1700 stores a control program for controlling or driving the robot cleaner and the resultant data. The memory 1700 may store audio information, image information, obstacle information, position information, map information, and the like. Furthermore, the memory 1700 may store information related to a moving pattern.

The memory 1700 mainly uses a nonvolatile memory. Here, the non-volatile memory (NVM, NVRAM) is a storage device capable of continuously storing information even when power is not supplied thereto, and for an example, the non-volatile memory may be a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an external signal detection sensor, a front detection sensor, a cliff detection sensor, a two-dimensional camera sensor, and a three-dimensional camera sensor.

The external signal detection sensor may sense an external signal of the mobile robot. The external signal detection sensor may be, for example, an infrared ray sensor, an ultrasonic sensor, a radio frequency (RF) sensor, or the like.

The mobile robot may receive a guide signal generated by the charging base using the external signal detection sensor to check the position and direction of the charging base. At this time, the charging base may transmit a guide signal indicating the direction and the distance to allow the mobile robot to return. In other words, the mobile robot may receive a signal transmitted from the charging base to determine a current position, set a moving direction, and return to the charging base.

On the other hand, the front detection sensor may be installed at predetermined intervals at a front side of the mobile robot, specifically along a lateral outer circumferential surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the controller 1800. In other words, the front sensor may detect protrusions on the moving path of the mobile robot, household appliances, furniture, walls, wall corners, and the like, and transmit the information to the controller 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may include a transmitter and a receiver, and the controller 1800 may determine whether or not there exists an obstacle based on whether or not ultrasonic waves radiated through the transmitter is reflected by the obstacle or the like and received at the receiver, and calculate a distance to the obstacle using the ultrasonic emission time and ultrasonic reception time.

Furthermore, the controller 1800 may compare ultrasonic waves emitted from the transmitter and ultrasonic waves received at the receiver to detect information related to a size of the obstacle. For example, the controller 1800 may determine that the larger the obstacle is, the more ultrasonic waves are received at the receiver.

In one embodiment, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

In other words, the transmitters may be spaced apart from the front center of the main body to the left and right sides, and one or two (or more) transmitters may be disposed between the receivers to form a receiving area of ultrasonic signals reflected from an obstacle or the like. With this arrangement, the receiving area may be expanded while reducing the number of sensors. A transmission angle of ultrasonic waves may maintain a range of angles that do not affect different signals to prevent a crosstalk phenomenon. Furthermore, the receiving sensitivities of the receivers may be set to be different from each other.

In addition, the ultrasonic sensor may be installed upward by a predetermined angle to output ultrasonic waves transmitted from the ultrasonic sensor in an upward direction, and here, the ultrasonic sensor may further include a predetermined blocking member to prevent ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front detection sensor may include an infrared sensor as a different type of sensor other than the ultrasonic sensor.

The infrared sensor may be installed on an outer circumferential surface of the mobile robot together with the ultrasonic sensor. The infrared sensor may also sense an obstacle existing at the front or the side to transmit obstacle information to the controller 1800. In other words, the infrared sensor may sense a protrusion on the moving path of the mobile robot, a household appliance, a furniture, a wall, a wall corner, and the like, and transmit the information to the controller 1800. Therefore, the mobile robot may move within a specific region without collision with the obstacle.

On the other hand, a cliff detection sensor (or cliff sensor) may sense an obstacle on the floor supporting the main body of the mobile robot mainly using various types of optical sensors.

In other words, the cliff detection sensor may be installed on a rear surface of the bottom mobile robot, but may of course be installed in a different position depending on the type of the mobile robot. The cliff detection sensor is a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which is provided with a transmitter and a receiver such as the obstacle detection sensor.

For an example, any one of the cliff detection sensors may be installed in front of the mobile robot, and the other two cliff detection sensors may be installed relatively behind.

For example, the cliff detection sensor may be a PSD sensor, but may also be configured with a plurality of different kinds of sensors.

The PSD sensor detects a short and long distance position of incident light with one p-n junction using a semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. In other words, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The cleaning unit 1900 cleans a designated cleaning area according to a control command transmitted from the controller 1800. The cleaning unit 1900 scatters dust in the vicinity through a brush (not shown) that scatters dust in a designated cleaning area, and then drives the suction fan and the suction motor to suck the scattered dust. In addition, the cleaning unit 1900 may perform mopping in a designated cleaning area according to the replacement of the configuration.

Furthermore, the controller 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the controller 1800 may determine whether to pass a cliff or not according to a ground state of the detected cliff by using the cliff detection sensor, and decide whether to pass the cliff or not according to the determination result. For example, the controller 1800 determines presence or non-presence of a cliff and a depth of the cliff through the cliff sensor, and then allows the mobile robot to pass through the cliff only when a reflection signal is detected through the cliff sensor.

For another example, the controller 1800 may determine a lifting phenomenon of the mobile robot using the cliff detection sensor.

On the other hand, the two-dimensional camera sensor is provided on one side of the mobile robot to acquire image information related to the surroundings of the main body during movement.

An optical flow sensor converts a downward image input from an image sensor provided in the sensor to generate image data in a predetermined format. The generated image data may be stored in the memory 1700.

Furthermore, one or more light sources may be installed adjacent to the optical flow sensor. The one or more light sources irradiate light to a predetermined region of the bottom surface captured by the image sensor. In other words, when the mobile robot moves in a specific region along the bottom surface, a predetermined distance is maintained between the image sensor and the bottom surface when the bottom surface is flat. On the other hand, when the mobile robot moves on a bottom surface having a nonuniform surface, the robot moves away from the bottom surface by more than a predetermined distance due to the irregularities of the bottom surface and obstacles. At this time, the one or more light sources may be controlled by the controller 1800 to adjust an amount of light to be irradiated. The light source may be a light emitting device capable of controlling the amount of light, for example, a light emitting diode (LED) or the like.

Using the optical flow sensor, the controller 1800 may detect a position of the mobile robot irrespective of the slip of the mobile robot. The controller 1800 may compare and analyze the image data captured by the optical flow sensor over time to calculate the moving distance and the moving direction, and calculate the position of the mobile robot on the basis of the moving distance and the moving direction. Using image information on a bottom side of the mobile robot using the optical flow sensor, the controller 1800 may perform slip-resistant correction on the position of the mobile robot calculated by another device.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

In one embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the three-dimensional camera sensor may include first and second lasers, wherein the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may be a sensor for sensing temperature, humidity, air pressure, gas, or the like.

Further, the communication unit 1100 may communicate with another robot cleaner 100 located in a specific area or within a predetermined range.

Figure 5A:
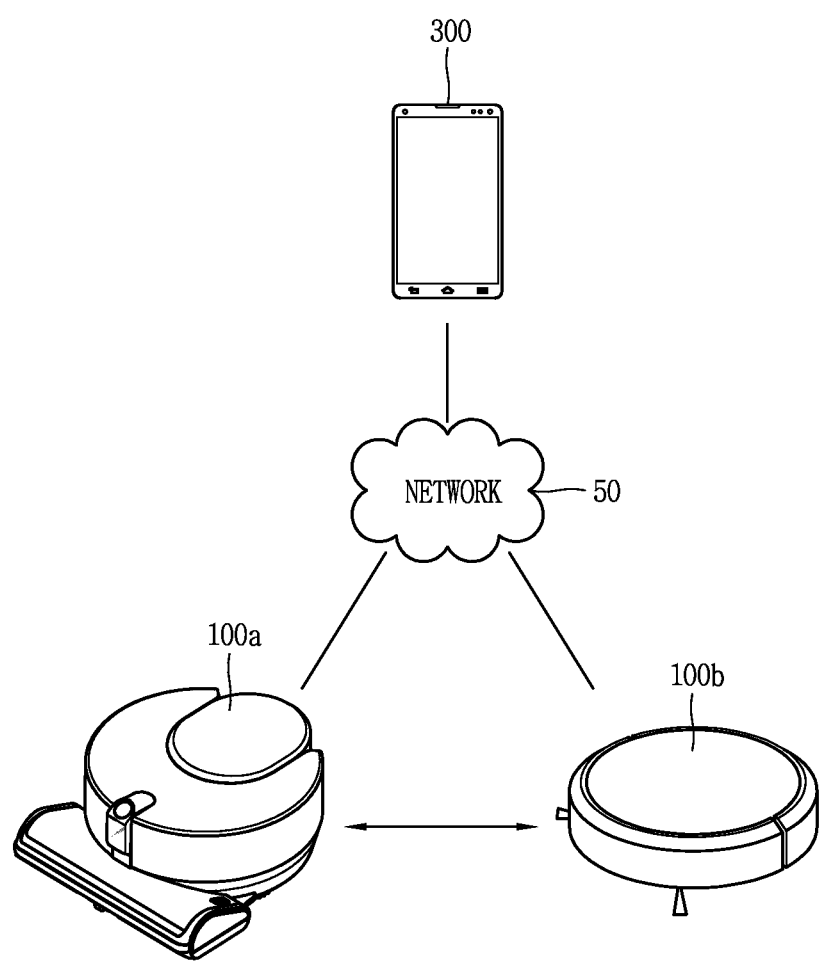
FIG. 5A is a conceptual view illustrating network communication between a plurality of mobile robots according to an embodiment of the present disclosure.
Figure 5B:
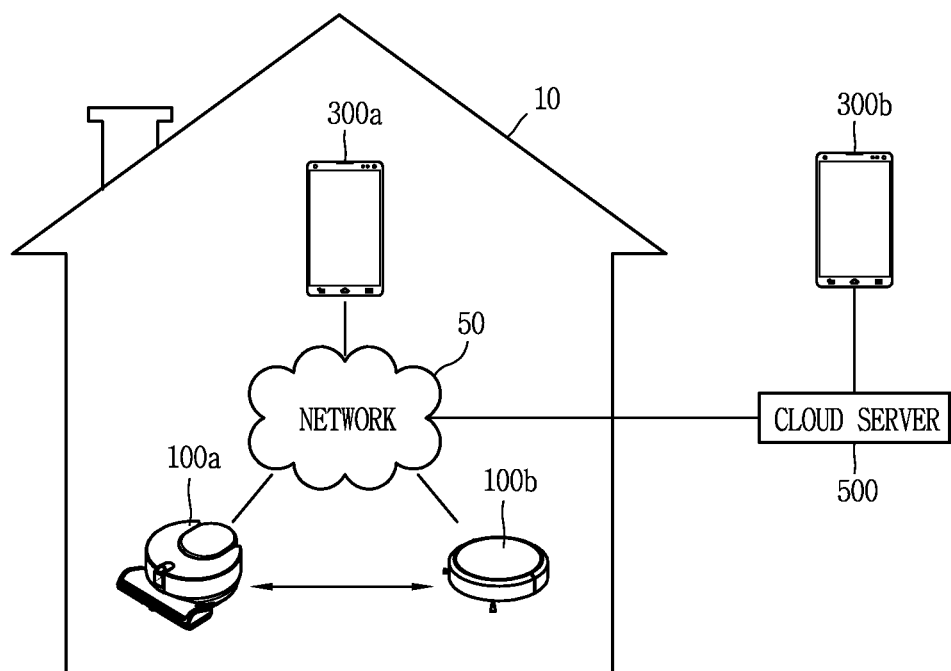
FIG. 5B is a conceptual view illustrating an example of the network communication of FIG. 5A.

Referring to FIGS. 5A and 5B, a first cleaner 100*a* and a second cleaner 100*b* that perform autonomous moving may exchange data with each other through network communication 50. In addition, the first cleaner 100*a* and/or the second cleaner 100*b* that perform autonomous moving may perform a cleaning related operation or a corresponding operation by a control command received from a terminal 300 through the network communication 50 or other communication.

In other words, although not shown, a plurality of cleaners 100a, 100b that perform autonomous moving may also perform communication with the terminal 300 through a first network communication and perform communication with each other through a second network communication.

Here, the network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

The network communication 50 may vary depending on a communication mode of the robot cleaners desired to communicate with each other.

In FIG. 5A, the first cleaner 100a and/or the second cleaner 100b that perform autonomous moving may provide information sensed by the respective sensing units thereof to the terminal 300 through the network communication 50. The terminal 300 may also transmit a control command generated based on the received information to the first cleaner 100a and/or the second cleaner 100b via the network communication 50.

In FIG. 5A, the communication unit of the first cleaner 100a and the communication unit of the second cleaner 100b may also directly communicate with each other or indirectly communicate with each other via another router (not shown), to recognize information related to a moving state and positions of counterparts.

In one example, the second cleaner 100b may perform a moving operation and a cleaning operation according to a control command received from the first cleaner 100a. In this case, it may be said that the first cleaner 100a operates as a master and the second cleaner 100b operates as a slave. Alternatively, it may be said that the second cleaner 100b follows the first cleaner 100a. In some cases, it may also be said that the first cleaner 100a and the second cleaner 100b collaborate with each other.

Hereinafter, a system including a plurality of cleaners 100a, 100b performing autonomous moving according to an embodiment of the present disclosure will be described with reference to FIG. 5B.

As illustrated in FIG. 5B, a cleaning system according to an embodiment of the present disclosure may include a plurality of cleaners 100a, 100b performing autonomous moving, a network 50, a server 500, and a plurality of terminals 300a and 300b.

The plurality of cleaners 100a, 100b, the network 50 and at least one terminal 300a may be disposed in a building 10 while another terminal 300b and the server 500 may be located outside the building 10.

The plurality of cleaners 100a, 100b are cleaners that perform cleaning while moving by themselves, and may perform autonomous moving and autonomous cleaning. Each of the plurality of cleaners 100a, 100b may include a communication unit 1100, in addition to the moving function and the cleaning function.

The plurality of cleaners 100a, 100b, the server 500 and the plurality of terminals 300a and 300b may be connected together through the network 50 to exchange data. To this end, although not shown, a wireless router such as an access point (AP) device and the like may further be provided. In this case, the terminal 300a located in the building (internal network) 10 may access at least one of the plurality of cleaners 100a, 100b through the AP device so as to perform monitoring, remote control and the like with respect to the cleaner. Also, the terminal 300b located in an external network may access at least one of the plurality of cleaners 100a, 100b through the AP device, to perform monitoring, remote control and the like with respect to the cleaner.

The server 500 may be directly connected in a wireless manner through the terminal 300b. Alternatively, the server 500 may be connected to at least one of the plurality of cleaners 100a, 100b without passing through the mobile terminal 300b.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100a, 100b, and may register product information regarding the plurality of cleaners 100a, 100b. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100a, 100b may be directly connected to each other wirelessly via Zigbee, Z-wave, Blue-Tooth, Ultra-wide band, and the like. In this case, the plurality of cleaners 100a, 100b may exchange position information and moving information with each other.

At this time, any one of the plurality of cleaners 100a, 100b may be a master cleaner 100a and another may be a slave cleaner 100b. For example, the first cleaner 100a may be a dry cleaner that sucks dust on the cleaning floor, and the second cleaner 100b may be a wet cleaner that mops the floor cleaned by the first cleaner 100a. Furthermore, the structures and specifications of the first cleaner 100a and the second cleaner 100b may be different from each other.

In this case, the first cleaner 100a may control the moving and cleaning of the second cleaner 100b. In addition, the second cleaner 100b may perform moving and cleaning while following the first cleaner 100a. Here, an operation in which the second cleaner 100b follows the first cleaner 100a refers to an operation in which the second cleaner 100b performs moving and cleaning by following the first cleaner 100a while maintaining a proper distance from the first cleaner 100a.

Figure 5C:
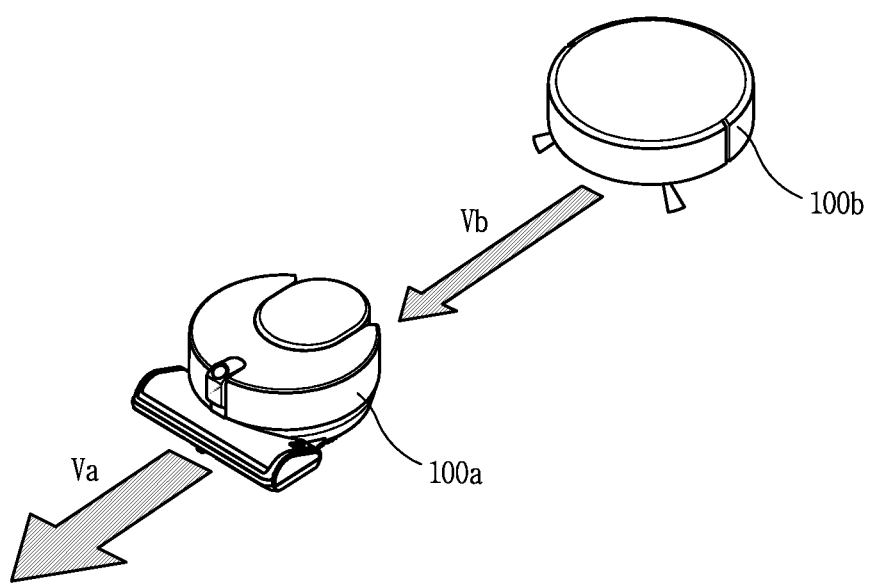
FIG. 5C is a conceptual view illustrating follow-up moving among a plurality of mobile robots according to an embodiment of the present disclosure.

Referring to FIG. 5C, the first cleaner 100a may control the second cleaner 100b such that the second cleaner 100b follows the first cleaner 100a.

For this purpose, the first cleaner 100a and the second cleaner 100b should exist in a specific area where they can communicate with each other, and the second cleaner 100b should recognize at least a relative position of the first cleaner 100a.

For example, the communication unit of the first cleaner 100a and the communication unit of the second cleaner 100b exchange IR signals, ultrasonic signals, carrier frequencies, impulse signals, and the like, and analyze them through triangulation, so as to calculate movement displacements of the first cleaner 100a and the second cleaner 100b, thereby recognizing relative positions of the first cleaner 100a and the second cleaner 100b. However, the present disclosure is not limited to this method, and one of the various wireless communication technologies described above may be used to recognize the relative positions of the first cleaner 100a and the second cleaner 100b through triangulation or the like.

When the first cleaner 100a recognizes the relative position with the second cleaner 100b, the second cleaner 100b may be controlled based on map information stored in the first cleaner 100a or map information stored in the server, the terminal or the like. In addition, the second cleaner 100b may share obstacle information sensed by the first cleaner 100a. The second cleaner 100b may perform an operation based on a control command (for example, a control command related to a moving direction, a moving speed, a stop, etc.) received from the first cleaner 100a.

Specifically, the second cleaner 100b performs cleaning while moving along a moving path of the first cleaner 100a. However, the moving directions of the first cleaner 100a and the second cleaner 100b do not always coincide with each other. For example, when the first cleaner 100a moves or rotates up/down/right/left, the second cleaner 100b may move or rotate up/down/right/left after a predetermined time, and thus current advancing directions of the first and second mobile robot 100a, 100b may differ from each other.

Also, a moving speed (Va) of the first cleaner 100a and a moving speed (Vb) of the second cleaner 100b may be different from each other.

The first mobile robot 100a may control the moving speed (Vb) of the second mobile robot 100b to vary in consideration of a distance at which the first mobile robot 100a and the second mobile robot 100b can communicate with each other. For example, if the first cleaner 100a and the second cleaner 100b move away from each other by a predetermined distance or more, the first cleaner 100a may control the moving speed (Vb) of the second cleaner 100b to be faster than before. On the other hand, when the first cleaner 100a and the second cleaner 100b move close to each other by a predetermined distance or less, the first cleaner 100a may control the moving speed (Vb) of the second cleaner 100b to be slower than before or control the second cleaner 100b to stop for a predetermined time. Accordingly, the second cleaner 100b can perform cleaning while continuously following the first cleaner 100a.

Furthermore, in the present disclosure, receiving sensors may be placed on rear and front sides of the first cleaner 100a to allow the controller of the first cleaner 100a to recognize the receiving direction of a signal received from the second cleaner 100b by distinguishing the front and rear sides. To this end, a UWB module may be provided at a rear side of the first cleaner 100a, and a UWB module or a plurality of sensors may be spaced apart from a front side of the first cleaner 100a. Alternatively, a single UWB module may be provided in the first cleaner 100a, and a plurality of antennas may be disposed on front, rear, left, and right sides thereof, respectively. The first cleaner 100a may recognize the receiving direction of a signal received from the second cleaner 100b to determine whether the second cleaner 100b is coming from the rear side of the first cleaner 100a or located at the front side thereof in a reversed manner.

Figure 6:
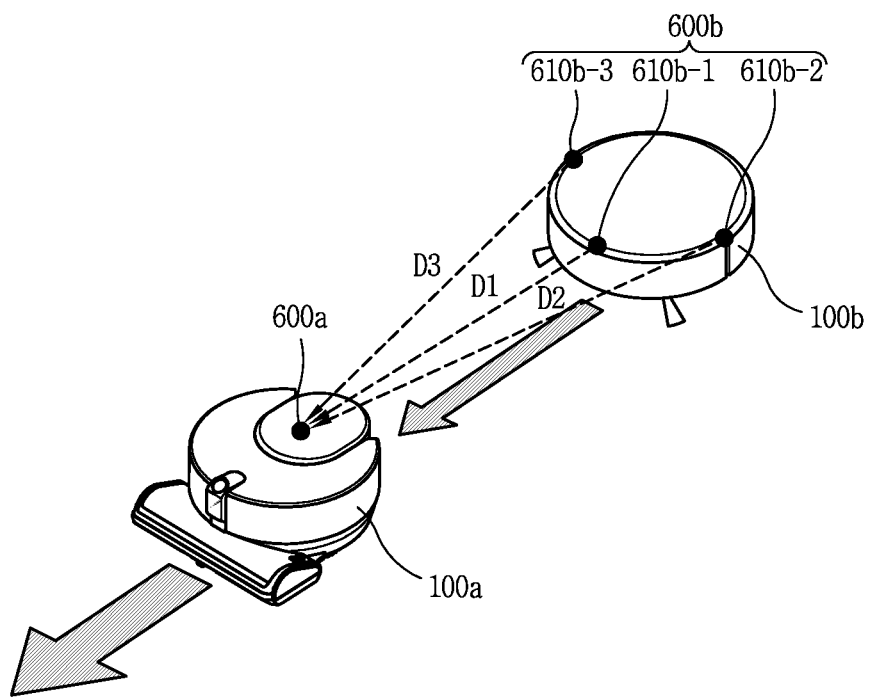
FIG. 6 is a conceptual view illustrating a method of allowing a plurality of mobile robots to determine relative positions to each other.

FIG. 6 shows an example of a method for recognizing relative positions between the first cleaner 100a and the second cleaner 100b. The first cleaner 100a and the second cleaner 100b may respectively send and receive signals, and recognize a relative position between each other. Here, the signal may be any one of wireless communication signals using wireless communication technologies such as Zigbee, Z-wave, and Bluetooth, in addition to an ultra-wide band (UWB) signal, an infrared signal, a laser signal, and an ultrasound signal, for example.

Referring to FIG. 6, transmitting sensors (e.g., a UWB sensor, an infrared sensor) and receiving sensors (e.g., a UWB sensor, an infrared sensor) may be included to determine relative positions between the first cleaner 100a and the second cleaner 100b. For an example, one transmitting IR sensor and three receiving IR sensors may be used, but the number is not limited thereto.

For an example, as illustrated in FIG. 6, a plurality of sensors 600b may be provided in the second cleaner 100b. For example, the sensors 600b may include a first IR sensor 610b-1, a second IR sensor 610b-2, and a third IR sensor 610-b, and the first through third IR sensors 610b-1, 610b-2, 610b-3 may be mounted on an outer circumferential surface of the main body of the second cleaner 100b, and disposed at different positions.

In this case, the first through third IR sensors 610b-1, 610b-2, 610b-3 may be spaced apart from one another on an outer circumferential surface of the main body of the second cleaner 100b. Meanwhile, the second cleaner 100b may receive a signal output from a sensor 600a provided in the first cleaner 100a through a sensor 600b. Furthermore, the second cleaner 100b may transmit a signal emitted from the sensor 600b to the first cleaner 100a, and the sensor 600a of the first cleaner 100a may receive the signal.

For example, the controller 1800 of the second cleaner 100b may measure intensities of signals, respectively, received at the first through third receiving sensors 610b-1, 610b-2, 610b-3 included in the sensor 600b.

The controller of the second cleaner 100b may apply a triangulation method based on the intensities of the signals measured at the sensors 610b-1, 610b-2, 610b-3.

Describing the triangulation method using the intensities of the signals in brief, the controller of the second mobile robot 100b may calculate a first distance (D1) with respect to the sensor 610b-1 based on the intensity of laser light received at the sensor 610b-1.

At this time, the first distance (D1) is determined by a product of the intensity of laser light and a scale, and the scale may be determined through an experiment. For example, the radius may be decreased as the intensity of laser light is increased. In other words, the radius and the intensity of the laser light may be inversely proportional to each other.

Similarly, the controller of the second mobile robot 100b may calculate a second distance (D2) with respect to the sensor 610b-2 based on the intensity of a signal received at the sensor 610b-2.

Furthermore, the controller of the second mobile robot 100b may calculate a third distance (D3) with respect to the sensor 610b-3 based on the intensity of a signal received at the sensor 610b-3.

For another example, a method of allowing the first cleaner 100a and the second cleaner 100b to determine relative positions to each other using the UWB module (or UWB sensor) will be described as follows.

The UWB module (or UWB sensor) may be included in the communication units 1100 of the first cleaner 100a and the second cleaner 100b. In view of the fact that the UWB modules are used to sense the relative positions of the first cleaner 100a and the second cleaner 100b, the UWB modules may be included in the sensing units 1400 of the first cleaner 100a and the second cleaner 100b.

For example, the first cleaner 100a may include a UWB module for transmitting ultra-wide band signals. The transmitting UWB module may be referred to as a second type transmitting sensor or a UWB tag-29.

Furthermore, the second cleaner 100b may include a receiving UWB module for receiving ultra-wide band signals output from a transmitting UWB module provided in the first cleaner 100a. The receiving UWB module may be named as a second type receiving sensor or a UWB anchor.

UWB signals transmitted/received between the UWB modules may be smoothly transmitted and received within a specific space.

Accordingly, even if an obstacle exists between the first cleaner 100a and the second cleaner 100b, if the first cleaner 100a and the second cleaner 100b exist within a specific space, they can transmit and receive the UWB signals.

The first cleaner and the second cleaner may measure the time of a signal transmitted and received between the UWB tag and the UWB anchor to determine a separation distance between the first cleaner and the second cleaner.

Specifically, for example, each of the plurality of cleaners 100a, 100b may be provided with one UWB sensor, or the first cleaner 100a may be provided with a single UWB sensor, and the second cleaner 100b following the first cleaner 100a may be provided with a single UWB sensor and at least one antenna or provided with at least two UWB sensors, so that the first cleaner 100a can measure distances to the second cleaner 100b at two different time points (t1, t2). The UWB sensor of the first cleaner 100a and the UWB sensor of the second cleaner 100b radiate UWB signals to each other, and measure distances and relative speed using Time of Arrival (ToA), which is a time that the signals come back by being reflected from the robots. However, the present disclosure is not limited to this, and may recognize the relative positions of the plurality of cleaners 100a, 100b using a Time Difference of Arrival (TDoA) or Angle of Arrival (AoA) positioning technique.

Specifically, description will be given of a method of determining the relative positions of the first cleaner 100a and the second cleaner 100b using an AoA positioning technique. In order to use the AoA (Angle of Arrival) positioning technique, each of the first cleaner 100a and the second cleaner 100b should be provided with one receiver antenna or a plurality of receiver antennas.

The first cleaner 100a and the second cleaner 100b may determine their relative positions using a difference of angles that the receiver antennas provided in the cleaners, respectively, receive signals. To this end, each of the first cleaner 100a and the second cleaner 100b must be able to sense an accurate signal direction coming from the receiver antenna array.

Since signals, for example, UWB signals, generated in the first cleaner 100a and the second cleaner 100b, respectively, are received only in specific directional antennas, they can determine (recognize) received angles of the signals. Under assumption that positions of the receiver antennas provided in the first cleaner 100a and the second cleaner 100b are known, the relative positions of the first cleaner 100a and the second cleaner 100b may be calculated based on signal receiving directions of the receiver antennas.

At this time, if one receiver antenna is installed, a 2D position may be calculated in a space of a predetermined range. On the other hand, if at least two receiver antennas are installed, a 3D position may be determined. In the latter case, a distance d between the receiver antennas is used for position calculation in order to accurately determine a signal receiving direction.

On the other hand, in the present disclosure, during follow-up/collaboration between the first cleaner 100a and the second cleaner 100b, the moving of the second cleaner 100b as a follower cleaner is controlled based on an actual length of a trajectory moved by the first cleaner 100a as a head cleaner.

The first cleaner 100a may move by rotating in a predetermined pattern according to a moving mode or perform cleaning while performing moving in a zigzag manner. Furthermore, the first cleaner 100a moves while changing moving direction according to the shape of cleaning space, the presence of obstacles, the topographic feature of the floor, and the like.

Accordingly, even though the second cleaner 100b follows the first cleaner 100a at the same movement speed, a separation distance between the first cleaner 100a and the second cleaner 100b may increase or decrease depending on the moving of the first cleaner 100a. Alternatively, a separation distance from the first cleaner 100a may be increased depending on the shape of a cleaning space, the presence of obstacles, the topographic feature of the floor, and the like during the follow-up moving of the second cleaner 100b.

In some cases, a separation distance between the first cleaner 100a and the second cleaner 100b may gradually decrease while a distance to be actually followed by the second cleaner 100b may further increase.

In this case, when the follow-up control of the second cleaner 100b is carried out based on the separation distance between the first cleaner 100a and the second cleaner 100b, the distance to be actually followed by the second cleaner 100b may further increase.

This reduces the visual stability of follow-up/collaboration control for a user and, and in some cases, the first cleaner 100a may stop moving and wait for the second cleaner 100b to prevent follow-up from being interrupted, thereby causing a delay in cleaning time.

Accordingly, in the present disclosure, within a range capable of determining relative positions between the first cleaner 100a and the second cleaner 100b, the follow-up of the second cleaner 100b is controlled based on a length of actual movement trajectory of the first cleaner 100a.

In this specification, the trajectory of movement of the first cleaner 100a may be determined by a method of being transmitted to the second cleaner 100b through the first cleaner 100a. Alternatively, it may be determined by a method of sequentially sensing the trajectory of movement of the first cleaner 100a through the sensor provided in the second cleaner 100b.

Here, the trajectory refers to a path connecting a plurality of points corresponding to a plurality of positions continuously passed while the first cleaner 100a as a head cleaner moves during cleaning. In addition, the positions of a trajectory may be defined as a plurality of points forming a trajectory, positions of the plurality of points or coordinates corresponding to the positions of the plurality of points.

In order to allow the second cleaner 100b to sense the trajectory of movement of the first cleaner 100a as described above, the first cleaner 100a must control to perform follow-up while maintaining a separation distance between the second cleaner 100b and the first cleaner 100a within a predetermined distance.

Hereinafter, the concept of controlling the follow-up of the second cleaner based on a distance of the trajectory of movement of the first cleaner will be described in detail with reference to FIGS. 7A and 7B.

Figure 7A:
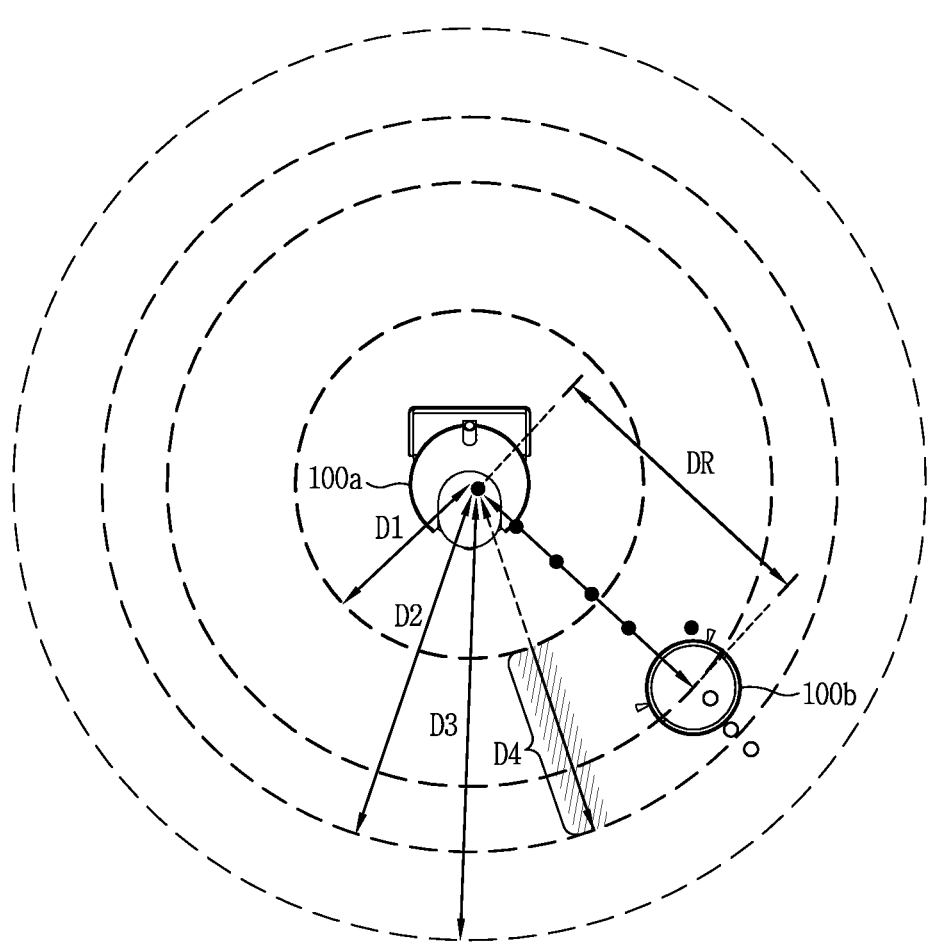
FIGS. 7A and 7B are views for explaining follow-up control of a second mobile robot based on a distance of the movement trajectory of a first mobile robot in a plurality of mobile robots according to an embodiment of the present disclosure.

First, referring to FIG. 7A, the first cleaner 100a a head cleaner performs cleaning while moving a movable space according to a preset algorithm (e.g., a cleaning algorithm, a moving algorithm).

Furthermore, the first cleaner 100a may control the second cleaner 100b to follow the positions of the plurality of points passed by the first cleaner 100a, that is, the positions of a trajectory.

To this end, the first cleaner 100a may sequentially transmit coordinate information corresponding to the positions of a trajectory passed by the first cleaner 100a to the second cleaner 100b. Alternatively, the second cleaner 100b may sequentially determine the positions of a trajectory corresponding to the movement of the first cleaner 100a through a sensor/communication module, for example, a UWB sensor and an antenna provided in front.

The second cleaner 100b as a follower cleaner, sequentially moves the positions of a plurality of points passed by the first cleaner 100a, that is, the positions of a trajectory.

To this end, the second cleaner 100b may receive coordinate information corresponding to the positions of a trajectory from the first cleaner 100a, and move to a position corresponding to the received coordinate information. Alternatively, the second cleaner 100b may sequentially store the positions of a trajectory corresponding to the movement of the first cleaner 100a through a sensor/communication module, for example, a UWB sensor and an antenna provided in front, and sequentially follow from a position close to a current position of the second cleaner 100b.

At this time, the first cleaner 100a controls the moving of the first cleaner 100a or the second cleaner 100b such that the length of a trajectory to be followed by the second cleaner 100b does not deviate from a predetermined follow-up distance range.

Here, the length of a trajectory to be followed by the second cleaner 100b denotes a remaining length of moving path for the second cleaner 100b to move along the trajectory of the first cleaner 100a from a current point of the second cleaner 100b to a current point (target point) of the first cleaner 100a.

Therefore, the length of a trajectory to be followed by the second cleaner 100b has a different concept from a separation distance between the first cleaner 100a and the second cleaner 100b.

However, the first cleaner 100a must control the moving speed such that a separation distance between the first cleaner 100a and the second cleaner 100b is neither too far nor too close even when the length of a trajectory to be followed by the second cleaner 100b does not deviate from a predetermined follow-up distance range.

The length of a trajectory to be followed by the second cleaner 100b is a length of line connecting a current position of the second cleaner 100b, the passed positions of a trajectory of the first cleaner 100a, and a current position of the first cleaner 100a. The first cleaner 100a and the second cleaner 100b may transmit and receive signals to recognize relative positions between the first cleaner 100a and the second cleaner 100b, and thus the current position of the second cleaner 100b and the current position of the first cleaner 100a may be easily determined.

Furthermore, the positions of a trajectory passed by the first cleaner 100a may be obtained by transmitting them to the second cleaner 100b from the first cleaner 100a at predetermined time intervals or at predetermined moving intervals of the first cleaner 100a.

Alternatively, as described above, the second cleaner 100b itself may obtain the positions of a trajectory corresponding to the movement of the first cleaner 100a located in front through a sensor/communication module, for example, a UWB sensor and an antenna provided in front by a predetermined distance unit. In this case, the second cleaner 100b may perform rotation to correspond to the moving direction of the first cleaner 100a in order to determine the trajectory of the first cleaner 100a.

There may be a plurality of positions of points forming a trajectory passed by the first cleaner 100a, and the second cleaner 100b may store information corresponding to the plurality of positions of points in a memory or the like. According to the control of the first cleaner 100a, the second cleaner 100b moves while following the plurality of positions of points corresponding to the stored information one by one.

On the other hand, when the first cleaner 100a moves on a curve in order to avoid an obstacle or the like, or when the first cleaner 100a moves while rotating by a predetermined angle according to a moving mode, the length of a trajectory to be followed by the second cleaner 100b may be larger than an actual separation distance between the first cleaner 100a and the second cleaner 100b.

However, when the trajectory to be followed by the second cleaner 100b is only straight moving, the separation distance (DR) between the first cleaner 100a and the second cleaner 100b and the length of the trajectory (a curve connecting black dots shown) to be followed by the second cleaner 100b may be the same.

Therefore, it may be said that the length of the trajectory to be followed by the second cleaner 100b is equal to or greater than the separation distance between the first cleaner 100a and the second cleaner 100b.

In addition, the predetermined follow-up distance range (hereinafter, referred to as "the predetermined range") denotes a reference for maintaining the length of a trajectory to follow by the second cleaner 100b in an appropriate range. The reason why the length of a trajectory to be followed by the second cleaner 100b is maintained in an appropriate range is to satisfy stability in both a control aspect such as a case where the first cleaner 100a suddenly stops moving or changes the moving direction and a visual aspect of the follow-up of the second cleaner 100b.

In FIG. 7A, the determined follow-up distance range (D4) may be a distance range satisfying a minimum separation distance (D1) or more as well as satisfying a maximum separation distance (D2) or less.

While the length of the trajectory to be followed by the second cleaner 100b maintains the determined follow-up distance range (D4), the second cleaner 100b is controlled to follow the positions of a trajectory (black dots shown) passed by the first cleaner 100a. At this time, a trajectory (white dots shown) out of the predetermined follow-up distance range (D4) may be ignored or deleted. This is to allow the second cleaner 100b to move to the current position of the first cleaner 100a as a target trajectory.

The second cleaner 100b follows the trajectory of the first cleaner 100a one by one from a time point when the length of the trajectory to be followed by the second cleaner 100b is equal to or greater than the minimum separation distance (D1). When the second cleaner 100b moves while following the trajectory, the first cleaner 100a also continues to move while performing cleaning, resulting in an additional trajectory. Therefore, the length of the trajectory to be followed by the second cleaner 100b is continuously varied.

The follow-up of the trajectory of the second cleaner 100b is continuously carried out until the length of the trajectory to be followed satisfies the minimum separation distance (D1) but does not exceed the maximum separation distance (D2).

A case where the length of the trajectory to be followed by the second cleaner 100b deviates from a predetermined follow-up distance range (D4) may largely be a case where it decreases to be less than the determined follow-up distance range (D4) or a case where it increases to exceed the predetermined follow-up distance range (D4).

The controller of the first cleaner 100a may continuously monitor whether the length of the trajectory to be followed by the second cleaner 100b deviates from the predetermined follow-up distance range (D4). Furthermore, when the length of the trajectory to be followed by the second cleaner 100b deviates from the predetermined follow-up distance range (D4), the moving of the first cleaner 100a and/or the second cleaner 100b may be controlled to satisfy the predetermined follow-up distance range (D4).

In one embodiment, when the length of the trajectory to be followed by the second cleaner 100b is less than the following follow-up distance range (D4), for example, when satisfied to be within the first separation distance range (D1) in FIG. 7A, the controller of the first cleaner 100a may transmit a control command for reducing the speed of the second cleaner 100b or transmit a stop command. Accordingly, the first cleaner 100a may control the length of the trajectory to be followed by the second cleaner 100b to be maintained again within the predetermined follow-up distance range (D4).

In addition, when the length of the trajectory to be followed by the second cleaner 100b increases to exceed the predetermined follow-up distance range (D2), for example, when the second separation distance range (D2) is satisfied in FIG. 7A, the controller of the first cleaner 100a controls the main body 100a to move at a reduced speed such that the length of the trajectory to be followed by the second cleaner 100b is maintained again within the predetermined follow-up distance range (D4).

Meanwhile, when the length of the trajectory to be followed by the second cleaner 100b is further increased to reach a critical stop distance (D3) in spite of the decelerated moving of the first cleaner 100a, the controller of the first cleaner 100a stops the moving of the first cleaner 100a.

The second cleaner 100b moves while following the positions of the trajectory of the first cleaner 100a one by one using the current position of the first cleaner 100a as a target.

Alternatively, the second cleaner 100b may directly move from its own position to the current position of the first cleaner 100a.

Figure 7B:
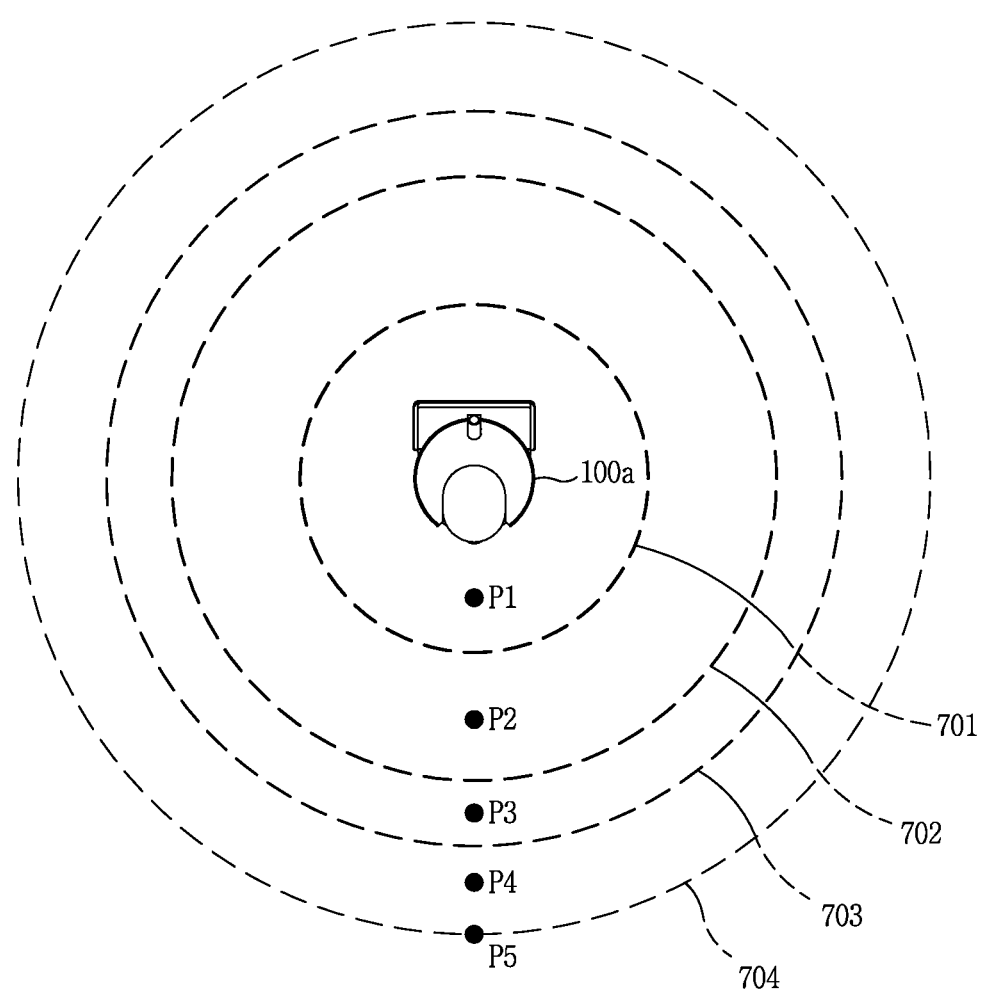

FIG. 7B shows a case where a separation distance between the first cleaner 100a and the second cleaner 100b is equal to the length of the trajectory to be followed by the second cleaner 100b. For example, a case where the first cleaner 100a and the second cleaner 100b move in the same direction within a range capable of determining relative positions between them will be described in detail.

In this case, the controller of the first cleaner 100a may control the moving of the first cleaner 100a and/or the second cleaner 100b such a separation distance between the first cleaner 100a and the second cleaner 100b is maintained within a predetermined follow-up distance range.

Alternatively, the controller of the second cleaner 100b may sense a trajectory corresponding to the movement of the first cleaner 100a, and then control moving to sequentially follow the positions of the trajectory sensed according to a control signal (e.g., a move command) of the first cleaner 100a.

The second cleaner 100b may be located at any one of different points (P1 to P5), and the second cleaner 100b performs follow-up moving with a target trajectory of the first cleaner 100a located at the center.

Each radius of a plurality of circles 701 to 704 shown in the drawing is associated with the "determined follow-up distance range" described with reference to FIG. 7A. For example, the radius of a first circle 701 may be equal to or less than or below a predetermined follow-up distance range. The radius of a second circle 702 may be a range satisfying a predetermined follow-up distance range. The radius of a third circle 703 may be equal to or larger than or over a predetermined follow-up distance range, and the radius of a fourth circle 704 may correspond to a critical stop distance.

When the second cleaner 100b is positioned (P1) in the first circle 701, the controller of the first cleaner 100a may transmit a moving stop command to the second cleaner 100b. Alternatively, the controller of the second cleaner 100b may stop moving by itself, and transmit a signal corresponding thereto to the first cleaner 100a.

A trajectory corresponding to the movement of the first cleaner 100a may be stored in the first cleaner 100a or the second cleaner 100b while the second cleaner 100b is in a stationary state, and then followed one by one by the second cleaner 100b when a predetermined follow-up distance range is satisfied.

When the second cleaner 100b is positioned (P2) between the first circle 701 and the second circle 702 or positioned (P3) between the second circle 702 and the third circle 703, it is satisfied within a predetermined follow-up distance range, and thus the second cleaner 100b is controlled to follow the trajectory of the first cleaner 100a one by one. At this time, the second cleaner 100b first follows the position of the trajectory closest to the current position of the second cleaner 100b among the positions of the trajectory existing within the predetermined follow-up distance range.

When the second cleaner 100b is positioned (P4) between the third circle 703 and the fourth circle 704, the controller of the first cleaner 100a controls the first cleaner 100a to move at a reduced speed. Furthermore, when the second cleaner 100b is positioned at a radius of the fourth circle 704 or exceeds the radius of the fourth circle 704, the controller of the first cleaner 100a stops the moving of the first cleaner 100a, thereby performing uninterrupted follow-up.

As described above, according to the present disclosure, within a range capable of determining relative positions between the first cleaner 100a and the second cleaner 100b, the second cleaner 100b is controlled to follow the trajectory of the first cleaner 100a while a distance of the trajectory to be followed by the second cleaner 100b maintains a predetermined range of follow-up distance.

Furthermore, when a distance of the trajectory to be followed by the second cleaner 100b deviates from the predetermined range, the first cleaner 100a varies the movement speeds of the first cleaner 100a and/or the second cleaner 100b (including a stop command), thereby satisfying stability in both the control and visual aspects of follow-up.

On the other hand, while the first cleaner 100a as a head cleaner performs cleaning while moving in a movable space according to a preset algorithm (e.g., a cleaning algorithm, a moving algorithm), a distance of the trajectory to be followed by the second cleaner 100b may increase or a separation distance between the first cleaner 100a and the second cleaner 100b may gradually decrease while satisfying the predetermined follow-up distance range.

For example, the first cleaner 100a may change its current moving direction according to a moving mode, the situation of an obstacle or the like to move in a direction approaching the second cleaner 100b. When the current moving direction of the second cleaner 100b following the passed trajectory of the first cleaner 100a is a direction approaching the first cleaner 100a, the first cleaner 100a and the second cleaner 100b approach closer to each other as time passes.

In this case, collision with each other may be avoided through a front sensor or the like provided in the first cleaner 100a and/or the second cleaner 100b. However, in order to prevent the cleaning time from being delayed while maintaining uninterrupted efficient follow-up between the first cleaner 100a and the second cleaner 100b, the first cleaner 100a and the second cleaner 100b, an optimal avoidance moving method in consideration of all of the first cleaner 100a and the second cleaner 100b, and surrounding situation must be implemented.

Hereinafter, with reference to FIG. 8, according to an embodiment of the present disclosure, a control method for avoidance moving in case where the first cleaner 100a and the second cleaner 100b approach each other will be described in detail.

Hereinafter, a first cleaner 100a and a second cleaner 100b have the same meaning as a first mobile robot 100a and a second mobile robot 100b, or a main body 100a and another mobile robot 100b, respectively. Furthermore, a plurality of cleaners 100a, 100b have the same meaning as a plurality of mobile robots or a plurality of robots. However, for convenience of explanation, they will be described as a first cleaner 100a and a second cleaner 100b or a plurality of cleaners 100a, 100b.

First, the first cleaner 100a performs communication with another cleaner 100b, that is, the second cleaner 100b which emits a signal, to recognize a relative position of the second cleaner 100b (S10).

To this end, the first cleaner 100a and the second cleaner 100b respectively transmit and receive signals to and from each other through an IR sensor, an ultrasonic sensor, a UWB sensor, or the like, to determine a direction and distance between each other.

Specifically, the first cleaner 100a may transmit a first signal through the foregoing sensor and analyze a second signal received from the second cleaner 100b, thereby recognizing a relative position of the second cleaner 100b based on the first cleaner 100a.

Furthermore, the second cleaner 100b may transmit a second signal through the foregoing sensor and analyze a first signal received from the first cleaner 100a, thereby recognizing a relative position of the first cleaner 100a based on the second cleaner 100b.

To this end, for example, one UWB sensor may be provided in each of the plurality of cleaners 100a, 100b, or a single UWB sensor may be provided in the first cleaner 100a and at least two UWB sensors may be mounted or a single UWB sensor and a plurality of antennas may be respectively provided in the second cleaner 100b following the first cleaner 100a. Through this, the first cleaner 100a may analyze a time difference between signals received at two different time points (t1, t2) to calculate a separation distance from the first cleaner 100a to the second cleaner 100b. Alternatively, relative positions to each other may be determined based on the positions of antennas and the angles of the signal receiving directions provided in the plurality of cleaners 100a, 100b, respectively. To this end, each of the plurality of cleaners 100a, 100b may be provided with one or more receiving antennas.

For example, the first cleaner 100a may include one or more antennas electrically connected to a single UWB sensor (or UWB tag). Here, the position of the antenna may be a back or rear side of the main body of the first cleaner 100a in consideration of the second cleaner 100b that emits a signal while following the first cleaner 100a from the rear side. However, the present disclosure is not limited thereto.

Furthermore, the second cleaner 100b may include a plurality of antennas electrically connected to a single UWB sensor (or UWB tag). Here, the positions of the plurality of antennas may be spaced apart from each other on a front/rear side, or may be spaced apart from each other on front and rear sides, respectively.

Here, the front and rear sides may be based on a moving direction of the main body of the second cleaner 100b, and the front side may be located on a front side with respect to the moving direction of the main body of the second cleaner 100b, and the rear side may be located on a rear side with respect to the moving direction of the main body of the second cleaner 100b.

Furthermore, a plurality of antennas provided in the second cleaner 100b may be spaced apart from each other as described above, thereby determining whether the second cleaner 100b is located on a rear side of the first cleaner 100a or located on a front side thereof in a reversed manner, based on the direction and intensity of a signal received from the first cleaner 100a.

In addition, it may be possible to determine whether the second cleaner 100b is located on a rear side of the first cleaner 100b or located on a front side thereof in a reversed manner, based on the direction and intensity of a signal received from the second cleaner 100b through an antenna provided in the first cleaner 100a.

Besides, the antenna or the plurality of antennas may be formed to transmit and receive various signals, and for an example, may be formed to transmit and receive a UWB (Ultra-Wide Band) signal when provided together with a UWB sensor.

As described above, since the plurality of cleaners 100a, 100b may determine relative positions to each other, and thus follow-up control may be carried out without any interruption by determining the relative positions to each other irrespective of the communication state of the server. In addition, it is easy to see whether the second cleaner 100b is following from the rear side of the first cleaner 100a or located in front of the first cleaner 100a based on the direction and intensity of the received signal.

Next, the first cleaner 100a moves by varying the moving speed of the first cleaner 100a to allow the second cleaner 100b to follow a trajectory corresponding to the movement of the first cleaner 100a based on the relative position of the second cleaner 100b (or the second cleaner 100b based on the relative position of the first cleaner 100a) (S20).

Here, the trajectory includes a plurality of points corresponding to a plurality of positions continuously passed while the first cleaner 100a moves during cleaning. Accordingly, the second cleaner 100b must recognize a plurality of points corresponding to a plurality of positions moved by the first cleaner 100a based on the position of the second cleaner 100b in a time sequence.

Furthermore, the controller of the first cleaner 100a may reduce moving speed or perform moving stop such that the length of a trajectory to be followed by the second cleaner 100b satisfies a predetermined follow-up distance range for uninterrupted follow-up between the first cleaner 100a and the second cleaner 100b.

Here, within the predetermined follow-up distance range denotes between values satisfying a predetermined minimum separation distance and more as well as satisfying a predetermined maximum separation distance or less. Therefore, within the predetermined follow-up distance range is excluded when a value is less than the predetermined follow-up distance range or exceeds the predetermined follow-up distance range.

In order to determine the length of a trajectory to be followed by the second cleaner 100b, the controller of the first cleaner 100a may determine the length of the trajectory to be followed by the second cleaner 100b based on the positions of a trajectory corresponding to the movement of the main body of the first cleaner 100a (i.e., the positions of a plurality of points forming the trajectory) and the relative position of the second cleaner 100b.

Alternatively, in order to determine the length of a trajectory to be followed by the second cleaner 100b, the controller of the second cleaner 100b may sequentially sense and store the positions of a trajectory corresponding to the movement of the first cleaner by itself, through the sensor/communication module, for example, the UWB sensor and the antenna, provided in front of the second cleaner 100b, and then determine the length of the trajectory to be followed by the second cleaner 100b, through the amount and number of the stored information.

For example, while the length of the trajectory corresponding to the number of stored information satisfies the predetermined follow-up distance range, the second cleaner 100b may sequentially move the positions of the trajectory corresponding to the stored information.

On the other hand, when the length of the trajectory corresponding to the movement of the first cleaner 100a to be followed by the second cleaner 100b is reduced to less than the predetermined follow-up distance range, the controller of the first cleaner 100a may transmit a moving stop command to the second cleaner 100b.

In addition, when the length of the trajectory corresponding to the movement of the first cleaner 100a to be followed by the second cleaner 100b exceeds the predetermined follow-up distance range, the controller of the first cleaner 100a may reduce the moving speed of the first cleaner 100a or output a moving stop command to the first cleaner 100a.

For another example, the controller of the second cleaner 100a may increase or decrease the moving speed of the second cleaner 100a or transmit a moving stop command to the first cleaner 100a such that the length of the trajectory to be followed by the second cleaner 100b satisfies the predetermined follow-up distance range. On the other hand, since a length of the trajectory to be followed by the second cleaner 100b and an actual separation distance between the first cleaner 100a and the second cleaner 100b have different concepts, when a separation distance between the first cleaner 100a and the second cleaner 100b decreases to be less than a predetermined range, the controller of the first cleaner 100a may decrease the moving speed of the first cleaner 100a for the time being even though the length of the trajectory to be followed by the second cleaner 100b satisfies the predetermined follow-up distance range.

Next, the first cleaner 100a may transmit a first signal to the second cleaner 100b in response to the approach of the main body of the first cleaner 100a toward the second cleaner 100b according to a change of moving direction (S30).

Here, a change of the moving direction of the first cleaner 100a may be carried out by a moving mode or various situation sensing.

Here, the moving mode may denote an operation mode in which a predetermined cleaning space is divided into a plurality of lines to allow the cleaner to move in a zigzag manner. When the end of a specific line is reached according to such a moving mode, the moving direction may be changed to move to the next line.

In addition, the various situation sensing may be carried out by one or more sensing signals. Specifically, the sensing signal includes one of a signal corresponding to a moving mode of the first cleaner 100a based on map information, signal reception by an external signal sensor, sensing of an obstacle by a front sensor/3D sensor/camera sensor/collision sensor, and sensing of a topographic feature of the floor by a cliff sensor/geomagnetic sensor, and a signal corresponding to sensing of entry into a region set to a virtual region (e.g., virtual wall, etc.), and sensing of entry into a trap learned by Deep Learning (DL)/Deep Neural Networks (DNN).

Hereinafter, an obstacle, a cliff, a topographic feature of the floor, a virtual region, a trap, and the like caused by a sensing signal triggering a change of the moving direction of the first cleaner 100a will be referred to as a "situation sensing object".

Furthermore, the change of the moving direction may denote that the moving direction and/or the moving region are changed by performing a rotational movement within a range of 5 to 360 from a current moving direction.

For example, the change of the moving direction may be a case where the first cleaner 100a faces a wall and rotates 180 degrees in a reverse direction to move the next moving region (next moving line). Furthermore, for example, the change of the moving direction may be a case where the first cleaner 100a senses a cliff through the cliff sensor and makes a left turn by 90 degrees from the current moving direction. Furthermore, the change of the moving direction may be a case where the first cleaner 100a recognizes that the next moving region is a learned trap and moves along the boundary of the trap region.

In addition, the change of the moving direction may be carried out in response to obstacle sensing. Here, the obstacle may include a fixed obstacle such as a wall, a furniture, a fixture, or the like, protruded from the floor of the cleaning area to obstruct the moving of the cleaner, and a moving obstacle. In addition, here, the obstacle sensing may include all movable information on the obstacle itself, such as the position, size, and width of the obstacle, whether or not to pass through the obstacle, a degree of change of moving direction, and the like.

Such a change of moving direction may be naturally sensed because the first cleaner 100a and the second cleaner 100b continuously obtain relative positions to each other.

On the other hand, a first signal is generated and transmitted only when the first cleaner 100a changes its current moving direction and approaches in a direction being closer to the second cleaner 100b due to one of the above-mentioned reasons.

Therefore, even though the first cleaner 100a changes its moving direction, the first signal is not transmitted to the second cleaner 100b when it is not the case where the first cleaner 100a approaches the second cleaner 100b or when the first cleaner approaches and then moves away from the second cleaner 100b.

Here, the first signal may denote a signal indicating that the first cleaner 100a approaches the second cleaner 100b and the first cleaner 100a will collide with the second cleaner 100b when a predetermined time elapses. Alternatively, the first signal may denote a signal including a move command for allowing the second cleaner 100b to move while avoiding the first cleaner 100a after a predetermined period of time.

In addition, the first signal may include information related to whether or not the second cleaner 100b is able to move while avoiding the first cleaner 100a, or may be transmitted together with a signal corresponding to such information.

Here, the information related to whether or not the second cleaner 100b is able to move while avoiding the first cleaner 100a denotes whether or not situation information on an obstacle, a trap, a carpet, a cliff and the like as described above within an expected path moved by the second cleaner 100b is sensed.

Furthermore, the controller of the first cleaner 100a may reduce the moving speed of the first cleaner 100a during the transmission of the first signal. Furthermore, the controller of the first cleaner 100a may transmit a command for reducing the moving speed to the second cleaner 100b or a stop command to the second cleaner 100b when the second cleaner 100b is moving during the transmission of the first signal. This may be referred to as a "trigger operation" for avoidance moving control described below.

Next, the controller of the first cleaner 100a performs control for avoidance moving between the first cleaner 100a and the second cleaner 100b based on a second signal responding to the first signal (S40).

When the first signal is received, the second cleaner 100b generates a second signal in response to the first signal.

Here, the second signal may denote a signal that the second cleaner 100b notifies its own relative position. The second signal may include product information such as a size (e.g., radius) and shape of the second cleaner 100b and moving related data such as a moving direction, moving speed, moving mode of the second cleaner 100b, and obstacle information sensed by the second cleaner 100b, and the like. Furthermore, the second signal may be an affirmative/negative response to a first situation that the second vacuum cleaner 100b moves while avoiding the first cleaner 100a after a predetermined period of time.

When the second signal is an affirmative response to the first situation, the first cleaner 100a may stop moving while the second cleaner 100b moves away from the first cleaner 100a based on the second signal.

When the second signal is a negative response to the first situation, the first cleaner 100a may stop moving and then transmit a response signal to the second signal, that is, a third signal, to the second cleaner 100b. Here, an example of the negative response to the first signal may be a case where the second cleaner 100b does not currently perform avoidance moving due to the presence of another obstacle or the like.

In addition, the second signal may be an affirmative/negative response to a second situation in which the first cleaner 100a is in an avoidable state.

In this case, when the second signal is an affirmative response to the second situation, the second cleaner 100b may move away from the first cleaner 100a, and the first cleaner 100a may move a current moving path as it is based on the second signal.

When the second signal is a negative response to the second situation, it is a situation that both the first cleaner 100a and the second cleaner 100b are in an unavoidable state. In this case, the controller of the first cleaner 100a controls the second cleaner 100b to move in a direction away from the first cleaner 100a until the second cleaner 100b moves out of the current moving path of the first cleaner 100a. In addition, the first cleaner 100a is controlled to move the current moving path while the second cleaner 100b moves in a direction away from the first cleaner 100a.

The foregoing control for avoidance moving between the first cleaner 100a and the second cleaner 100b may be carried out through the controller of the second cleaner 100b. In this case, the first signal transmitted from the first cleaner 100a may be a signal indicating the position of the first cleaner 100a. In addition, the second signal transmitted from the second cleaner 100b may include a command for reducing the moving speed of the first cleaner 100a. The second cleaner 100b may perform an operation performing avoidance movement while the first cleaner 100a moves at a reduced speed according to the second signal.

On the other hand, the foregoing control of avoidance moving according to various situations is ended when the second cleaner 100b is visually located on the rear side of the first cleaner 100a.

To this end, the controller of the first cleaner 100a detects a time point when a signal emitted from the second cleaner 100b is received from the rear side of the first cleaner 100a after the main body of the first cleaner 100a moves in a direction away from the second cleaner 100b according to the avoidance moving between the first cleaner 100a and the second cleaner 100b. Then, at the time point when such a signal is detected, the control of avoidance moving is ended.

As described above, according to the present disclosure, when the first cleaner 100a approaches the second cleaner 100b as a follower cleaner in accordance with a change of moving direction of the first cleaner 100a as a head cleaner, appropriate avoidance moving control may be carried out for various situations, thereby satisfying both uninterrupted efficient follow-up control and visual stability of the user.

Hereinafter, the control of avoidance moving according to a change of moving direction described above will be described in more detail for various situations.

Hereinafter, examples of avoidance moving operations associated with a method of allowing a follower cleaner to move while avoiding a head cleaner when a head cleaner approaches another cleaner according to a change of moving direction will be described with reference to FIGS. 9A, 9B, 9C, 9D, 9E, 9F and 9G.

Figure 9A:
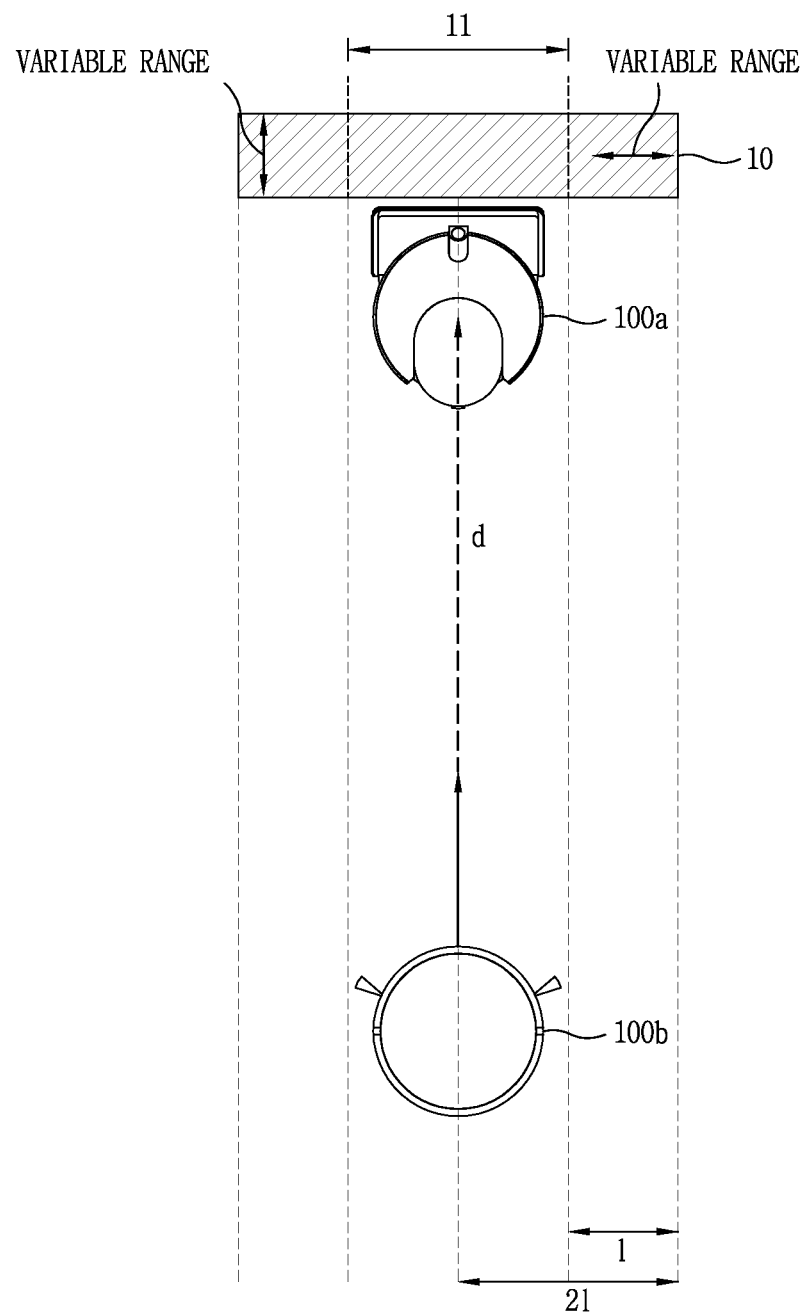
FIGS. 9A, 9B, 9C, 9D, 9E, 9F and 9G are conceptual views for explaining avoidance moving operations associated with moving while another mobile robot avoids a main body when approaching the another mobile robot according to a change in moving direction, in an embodiment of the present disclosure.

Referring to FIG. 9A, the first cleaner 100a as a head cleaner moves a designated cleaning space in a predetermined moving mode (e.g., zigzag manner). For example, the first cleaner 100a moves on a first line 11 entirely, then changes its moving direction to moves along a second line. Here, the width of lines may be formed to overlap with each other by about half. In other words, when the width of the first line 11 is 2 L, it overlaps with the second line which is the next line by a width (L).

The second cleaner 100b as a follower cleaner moves on the first line 11 while following a trajectory corresponding to the movement of the first cleaner 100a while satisfying the above-mentioned determined follow-up distance range (d).

At this time, when the length of a trajectory to be followed by the second cleaner 100b is further decreased beyond the predetermined follow-up distance range (d), the controller of the first cleaner 100a stops the second cleaner 100b or transmits a control command for reducing the speed. Furthermore, when the length of a trajectory to be followed by the second cleaner 100b is further separated beyond the predetermined follow-up distance range (d), the controller of the first cleaner 100a controls the first cleaner 100a to move at a reduced speed or to stop.

In FIG. 9A, when the first cleaner 100a reaches the end of the first line 11 according to a moving mode or when a sensing signal corresponding to a situation sensing object 10 such as an obstacle or the like is sensed, a current moving direction may be changed.

Here, the values of a size, a height, and a width of the situation sensing object 10 causing a change of moving direction are all variable, and may be set at the time of manufacturing a product or may be changed by the user.

In the present disclosure, a case where the moving direction of the first cleaner 100a is changed has been described as an example using only a case where it is rotated by 180 degrees with respect to a current moving direction, but the present disclosure is not limited thereto. For example, the present disclosure may also include a case where the moving direction is changed by rotating within a preset range, for example, at an angle within 150 to 210 degrees, or a case where the moving direction is additionally changed as being rotated at an angle out of the preset range and then additionally rotated due to facing another obstacle.

Figure 9B:
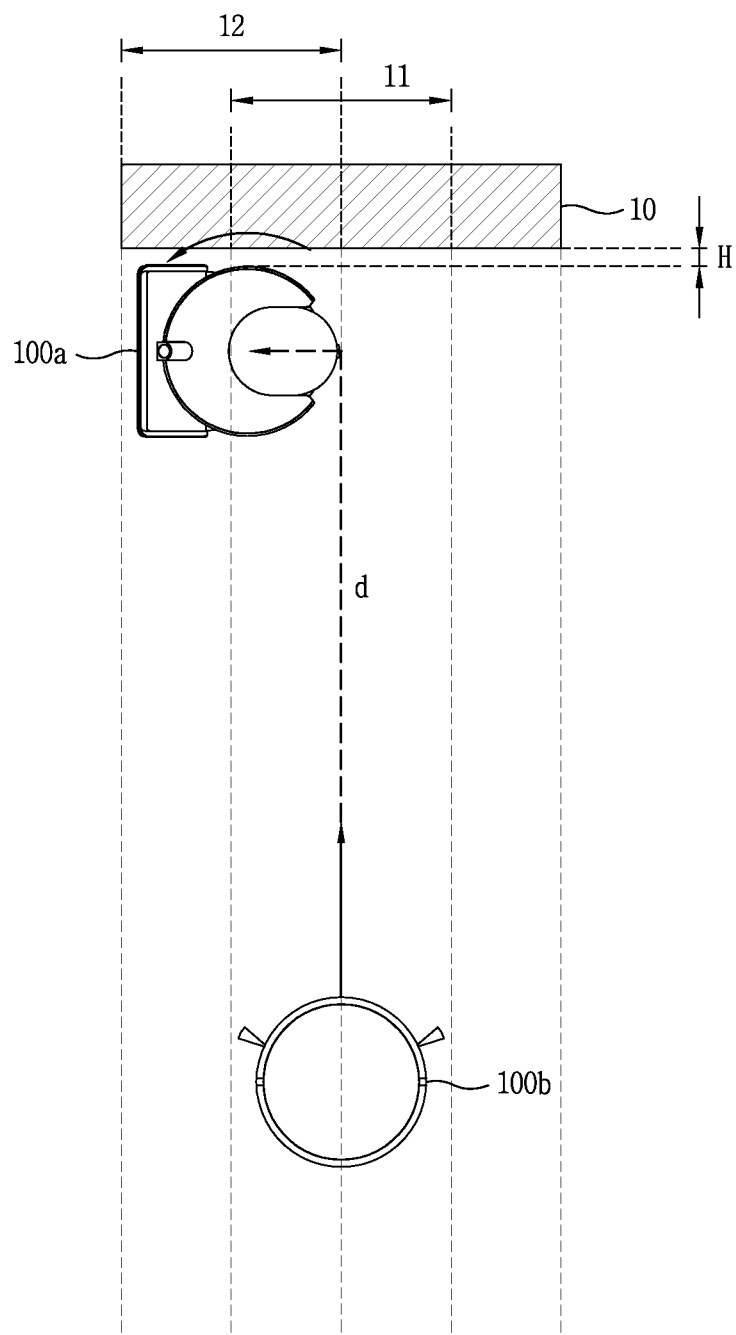

Referring to FIG. 9B, the controller of the first cleaner 100a rotates the moving direction by 90 degrees in a counterclockwise direction with respect to the forward direction, and then moves while following the situation sensing object 10, for example, an outer edge of a wall, with a predetermined separation distance (H).

Figure 9C:
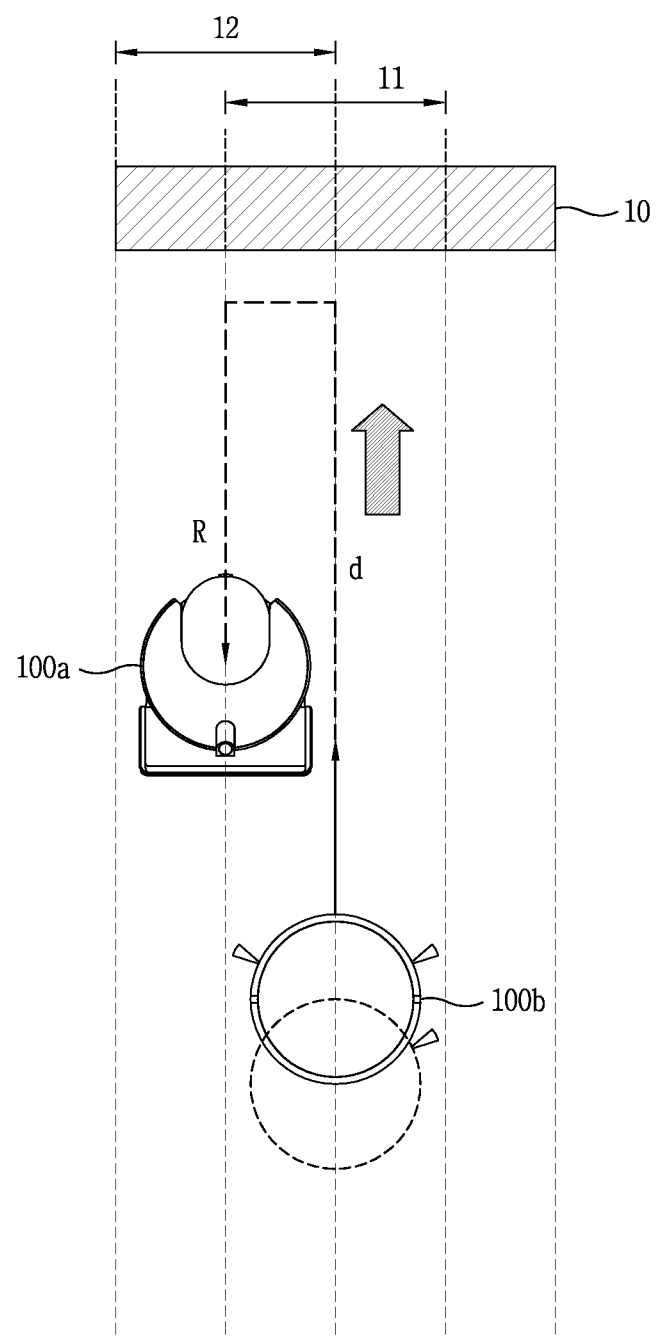

Subsequently, in order to enter the second line 12, it rotates (R) by 90 degrees once more in a counterclockwise direction as illustrated in FIG. 9C. Now, the first cleaner 100a moves on the second line 12 in the changed moving direction, that is, in a direction rotated by 180 degrees with respect to the previous moving direction.

At this time, since the second cleaner 100b continues to move on the first line 11 along a trajectory moved by the first cleaner 100a, even though the length (d) of the trajectory satisfies a predetermined follow-up distance range, a separation distance between the first cleaner 100a and the second cleaner 100b decreases as time elapses.

Figure 9D:
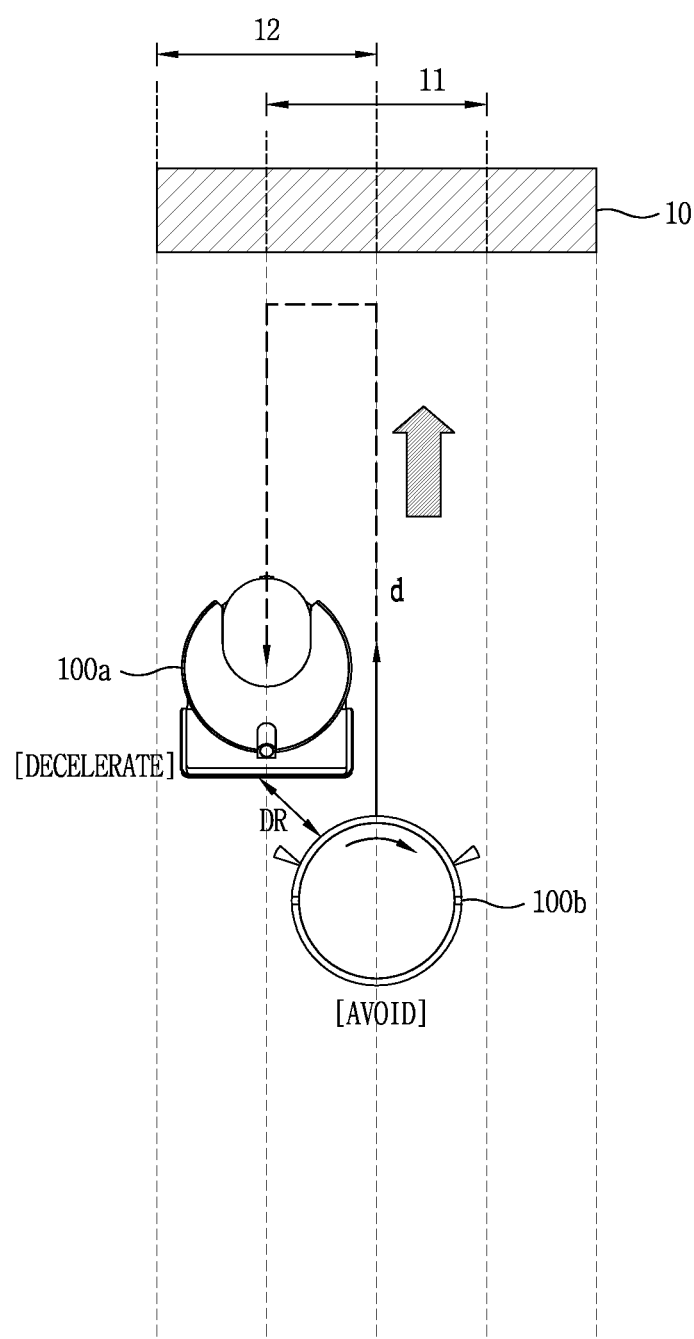

Accordingly, as illustrated in FIG. 9D, when the first cleaner 100a approaches the second cleaner 100b moving on the first line 11 to be closer thereto within a preset range (DR), the controller of the second cleaner 100a reduces the current moving speed and transmits a first signal to the second cleaner 100b.

Here, the first signal may be a signal including a command for allowing the second cleaner 100b to move while deviating from the current moving path, that is, the first line 11, to avoid the first cleaner 100a. In addition, the first signal may include a moving stop command of the second cleaner 100b.

When the first signal is received, the controller of the second cleaner 100b may reduce the moving speed of the first line 11 or stop moving in response to the first signal, and rotate the moving unit such that the front side of the second cleaner 100b faces an expected position to move.

Then, the second signal affirming the first signal may be transmitted to the second cleaner 100b. Here, the second signal may be a signal informing the avoidance movement of the second cleaner 100b. In addition, the second signal may include a command for decelerating or stopping the moving of the first cleaner 100a.

Figure 9E:
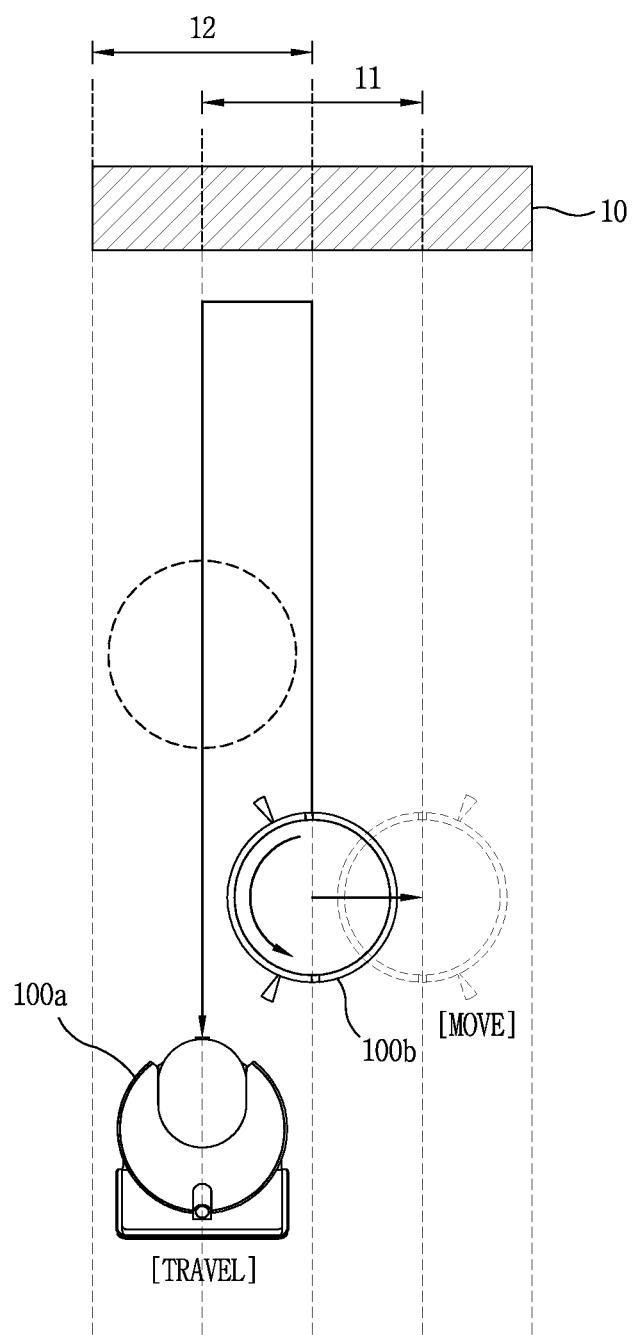

Next, referring to FIG. 9E, the second cleaner 100b moves while avoiding the first cleaner 100a subsequent to transmitting the second signal. At this time, the first cleaner 100a maintains the current line, that is, the second line 12. The reason why the first cleaner 100a maintains the second line 12 and controls the second cleaner 100b to perform avoidance moving as described above is to perform the cleaning path plan of the first cleaner 100a without error.

The controller of the second cleaner 100b transmits a control command for decelerating or stopping the moving of the first cleaner 100a while the second cleaner 100b moves away from the first cleaner 100a. The controller of the first cleaner 100a may perform avoidance moving at a reduced moving speed or instantaneously stop and then move during the movement of the second cleaner 100b.

On the other hand, as illustrated in FIG. 9E, while the first cleaner 100a continues to move on the second line and is located in front of the second cleaner 100b, the controller of the second cleaner 100b may maintain a stationary state at the moved position.

Specifically, the controller of the second cleaner 100b performs a rotational motion to rotate by 90 degrees in a direction away from the first cleaner 100a and the second line 12, and then moves to an avoidance point that satisfies a predetermined separation distance (e.g., about 55 to 60 cm) from the first cleaner 100a. Here, the predetermined separation distance is a separation distance allowing the avoidance moving of the first cleaner 100a, and may be set to twice the radius of the cleaner.

Then, the controller of the second cleaner 100b may align the front side of the second cleaner 100b toward a previous moving direction, that is, a first situation sensing object 10a.

The second cleaner 100b moves away from the first cleaner 100a to the avoidance point, and then the first cleaner 100a continues to move on the second line 12 illustrated in FIG. 9E. In other words, the first cleaner 100a moves without deviating from the current moving line.

Meanwhile, the controller of the second cleaner 100b may perform in-place rotation for finding the position of the first cleaner 100a by itself when the first cleaner 100a deviates from the sensing region of the second cleaner 100b as the second cleaner 100b performs avoidance moving with respect to the first cleaner 100a and the first cleaner 100a continues to move.

While the second cleaner 100b moves away from the first cleaner 100a through such a rotational motion, the controller of the second cleaner 100b may continuously sense the positions of the trajectory of the first cleaner 100a, i.e., a plurality of points corresponding to the movement.

This rotational motion is ended when the first cleaner 100a stops moving and/or when the second cleaner 100b continues moving again.

Figure 9F:
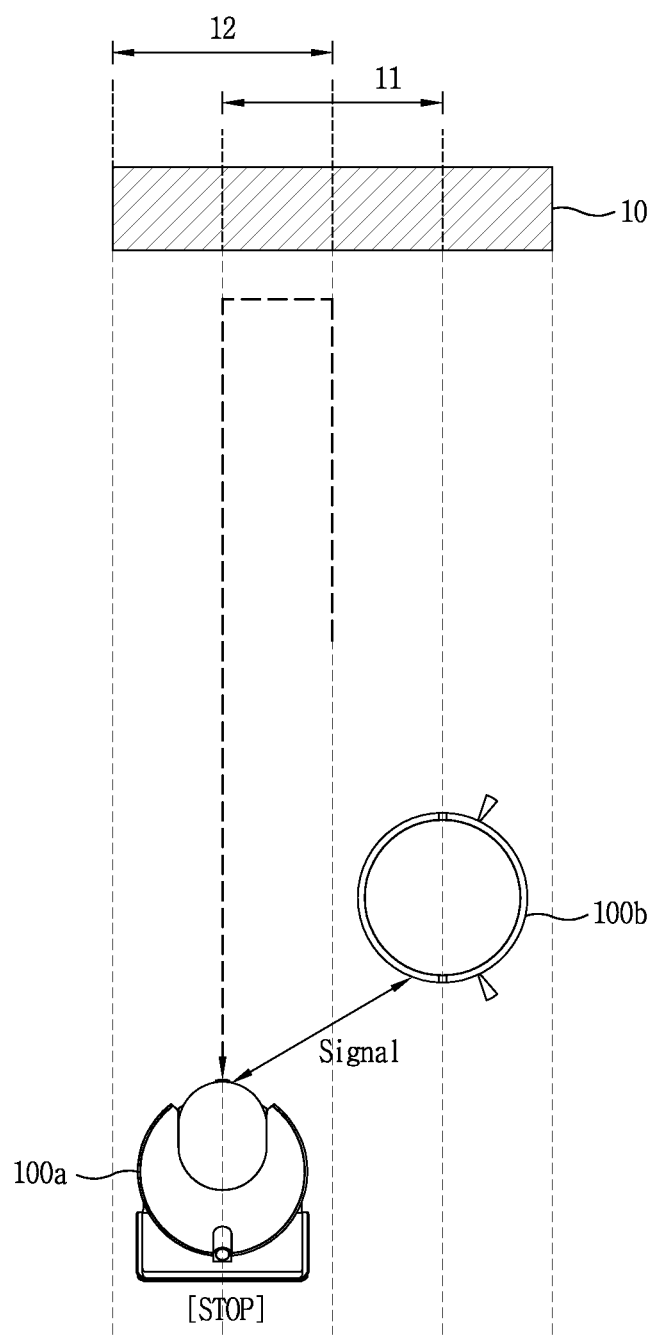

Referring to FIG. 9F, avoidance moving based on the second signal is ended at a time point when the second cleaner 100b moves in a direction away from the first cleaner 100a and a signal emitted from the second cleaner 100b is sensed at the rear side of the first cleaner 100a. In other words, avoidance moving according to the present disclosure is ended when the second cleaner 100b is located behind with respect to the moving direction of the first cleaner 100a.

To this end, the controller of the first cleaner 100a may sense that the second cleaner 100b is located behind the first cleaner 100a based on the direction and intensity of a signal emitted from the sensor/communication module of the second cleaner 100b received by the sensor/communication module of the first cleaner 100a.

In other words, the controller of the second cleaner 100b may sense that the first cleaner 100a is located in front of the second cleaner 100b with respect to the moving direction of the first cleaner 100a based on the direction and intensity of a signal emitted from the sensor/communication module of the first cleaner 100a received by the sensor/communication module of the second cleaner 100b.

The controller of the first cleaner 100a outputs a control command for stopping the moving of the first cleaner 100a such that the second cleaner 100b is able to follow the movement trajectory of the first cleaner 100a according to the end of avoidance moving based on the second signal. In addition, the controller of the second cleaner 100b moves while following the positions of the movement trajectory of the first cleaner 100a at the moved position.

Meanwhile, the second cleaner 100b may sequentially store the positions of the first cleaner 100a sensed through a rotational motion, for example, in the memory, at a position moved according to avoidance moving.

Figure 9G:
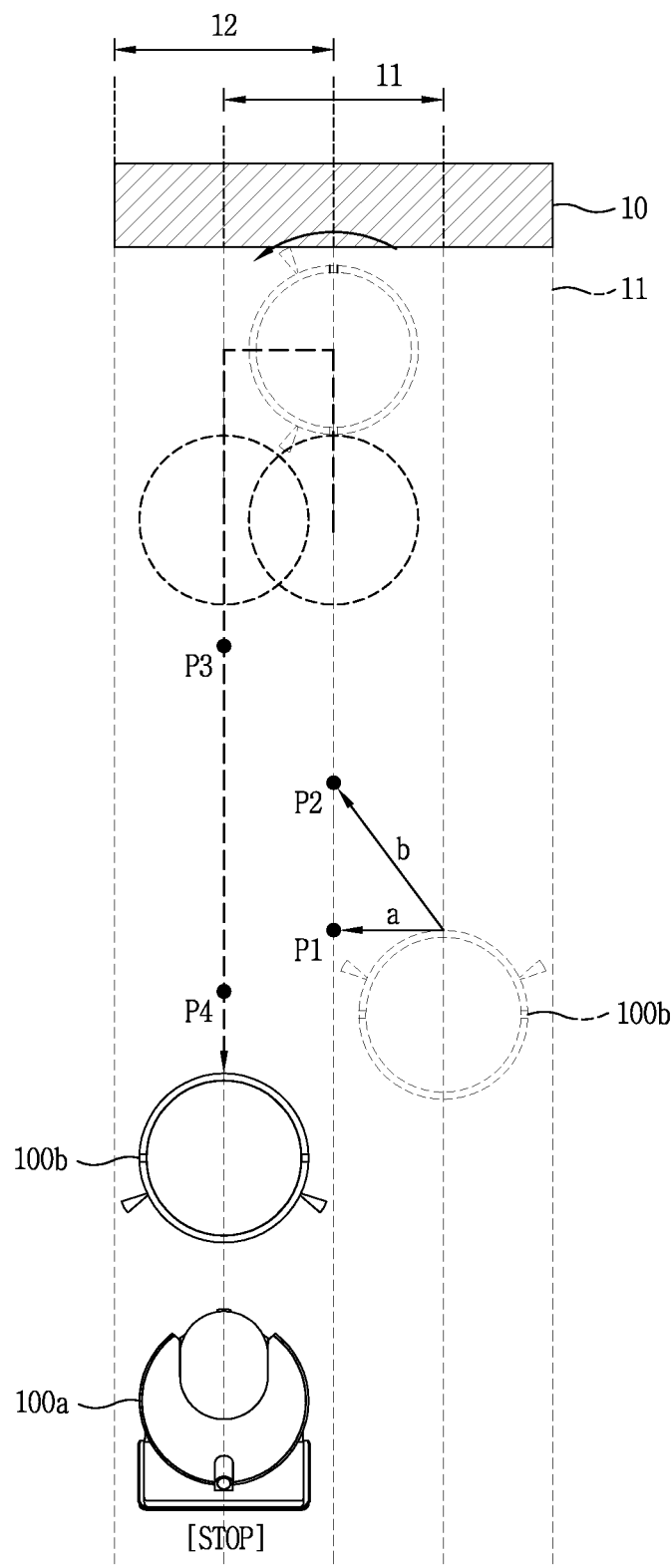

Accordingly, in FIG. 9G, the second cleaner 100b may recognize all the positions of the movement trajectory of the first cleaner 100a, i.e., the coordinates of a plurality of points (P1, P2, P3, P4).

At this time, the second cleaner 100b may return to a position (a) prior to avoidance moving from the moved position as illustrated in FIG. 9G, and then move while sequentially following the coordinates of positions (P2, P3, P4) of the movement trajectory of the first cleaner 100a from the position (P1).

Alternatively, the second cleaner 100b may move (b) to the moved position, that is, the position (P2) of the trajectory of the first cleaner 100a close to the current position, and then move while sequentially following the coordinates of positions (P3, P4) of the movement trajectory. In other words, follow-up for the position (P1) of a specific trajectory of the first cleaner 100a may be skipped.

While the second cleaner 100b follows the movement trajectory of the first cleaner 100a, the first cleaner 100a may maintain a moving stop state. In this case, when a distance of the trajectory of the first cleaner 100a to be followed by the second cleaner 100b is decreased to a predetermined follow-up distance range, specifically a minimum separation distance in FIG. 7B, the first cleaner 100a starts moving again.

Meanwhile, in one example, it may be controlled such that the time point when the second cleaner 100b follows a trajectory corresponding to the movement of the first cleaner 100a is determined to be immediately before the second cleaner 100b completely stops. In such a case, it may be possible to provide a feeling that visually more natural follow-up is initiated.

For another embodiment, FIGS. 10A, 10B, 10C and 10D are examples of avoidance moving operations associated with allowing a head cleaner to move while avoiding a follower cleaner when the head cleaner approaches the other cleaner according to a change of moving direction.

Figure 10A:
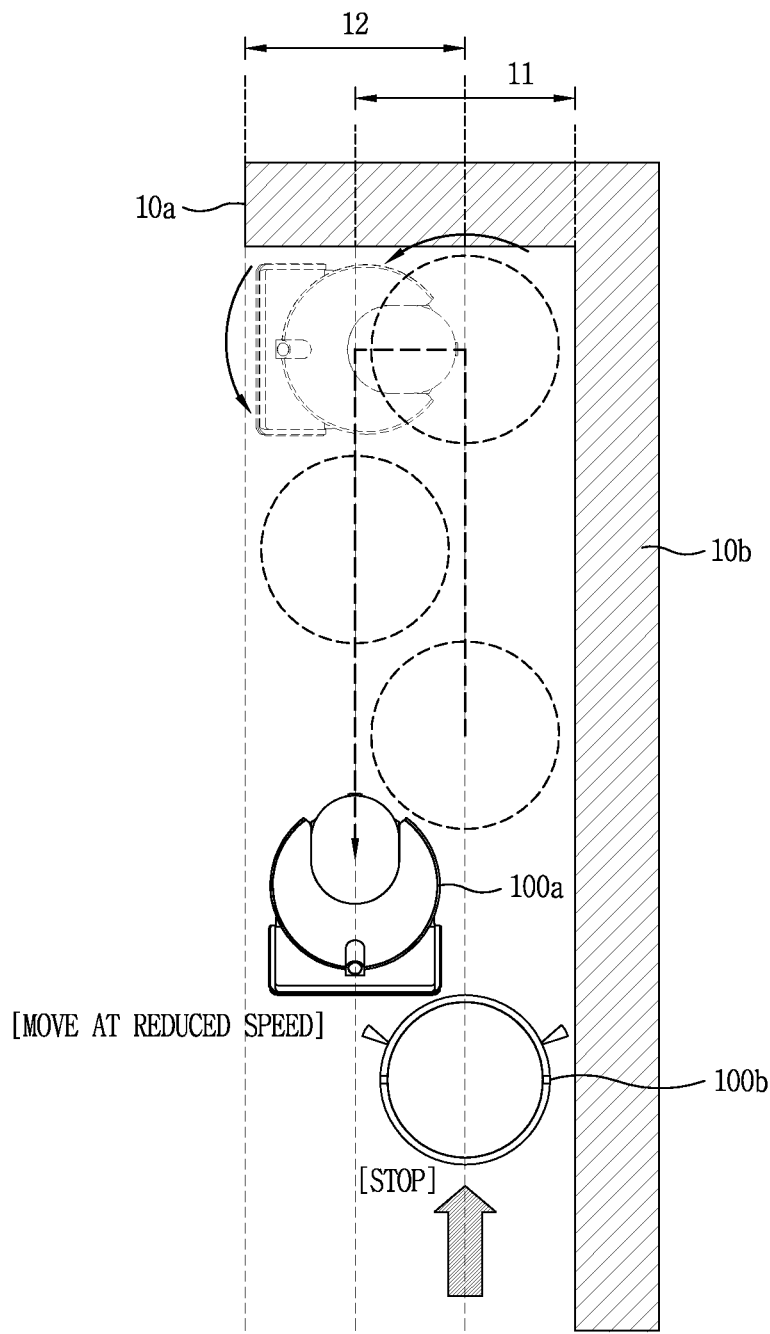
FIGS. 10A, 10B, 10C, 10D, 10E, 11A, 11B, 11C, 11D, 11E and 11F are conceptual views for explaining different avoidance moving operations associated with moving while a main body avoids another mobile robot in a state that the another mobile robot is unable to avoid when approaching the another mobile robot according to a change in moving direction, in another embodiment of the present disclosure.

Referring to FIG. 10A, it illustrates a case where the first cleaner 100a moves straight while sensing a second situation sensing object 10b, and then senses a first situation sensing object 10a, and enters the second line 12.

In this case, when the first cleaner 100a approaches the second cleaner 100b moving on the first line 11 to be closer thereto within a preset range, as illustrated in FIG. 10A, the controller of the first cleaner 100a reduces the current moving speed and transmits a first signal to the second cleaner 100b.

At this time, the first signal may be a signal including a command for moving the second cleaner 100b while avoiding the first cleaner 100a. However, the second cleaner 100b is unable to move sideways out of the first line 11 due to the second situation sensing object 10b.

Thus, the second cleaner 100b transmits a second signal indicating an unavoidable state of the second cleaner 100b. Here, the unavoidable state is a case where the second cleaner 100b must move by deviating from the first line 11 in a rightward direction to move while avoiding the first cleaner 100a, but the second situation sensing object 10b is sensed in the rightward direction to detect an unavoidable state.

Figure 10B:
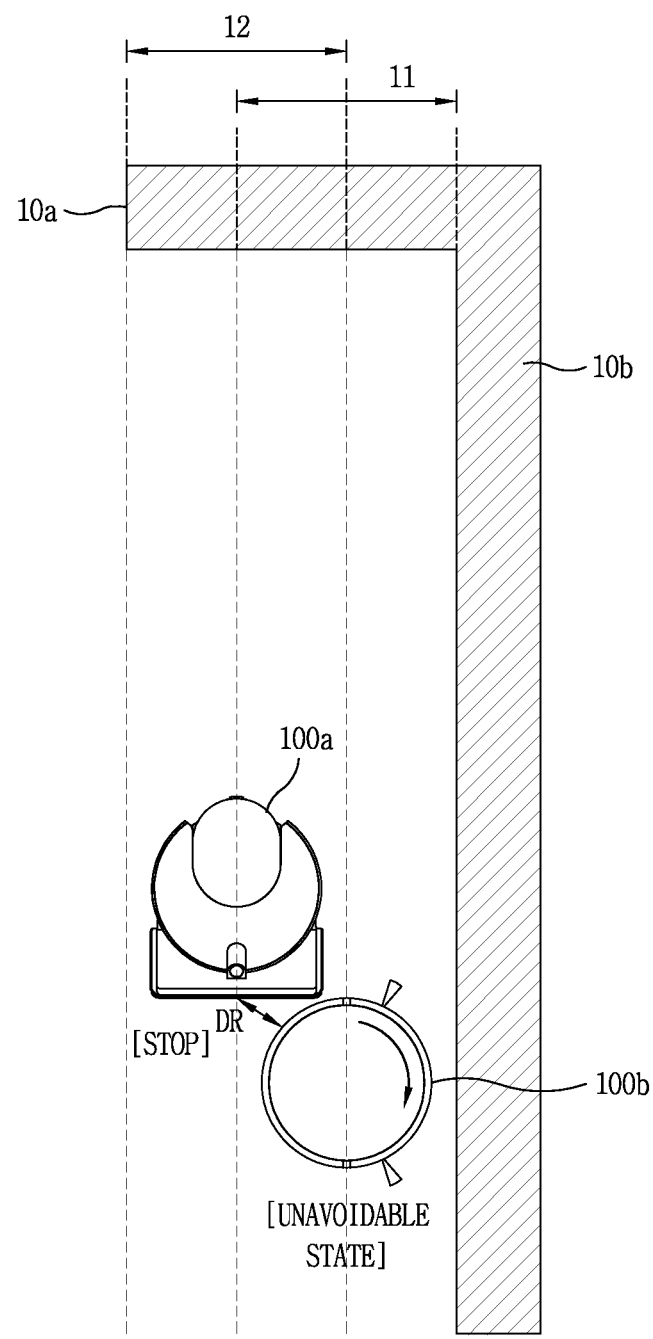

In response to the detection of the unavoidable state of the second cleaner 100b from the second signal as described above, the controller of the first cleaner 100a may temporarily stop the first cleaner 100a as illustrated in FIG. 10B.

Next, it is determined whether the first cleaner 100a is in an avoidable state, and a response signal indicating that the avoidance moving of the first cleaner 100a is allowed is transmitted to the second cleaner 100b. At this time, the response signal may include a moving stop command to the second cleaner 100b.

In addition, when the second signal is received, the controller of the first cleaner 100a immediately performs a rotational motion for searching for a position where the first cleaner 100a moves. At this time, the rotational motion may be a rightward direction with respect to the moving direction of the first cleaner 100a or a leftward direction with respect to the moving direction of the second cleaner 100b.

When the first cleaner 100a is in an avoidable state, the controller of the first cleaner 100a controls avoidance moving such that the first cleaner 100a moves in a direction away from the second cleaner 100b based on the second signal of the second cleaner 100b.

Figure 10C:
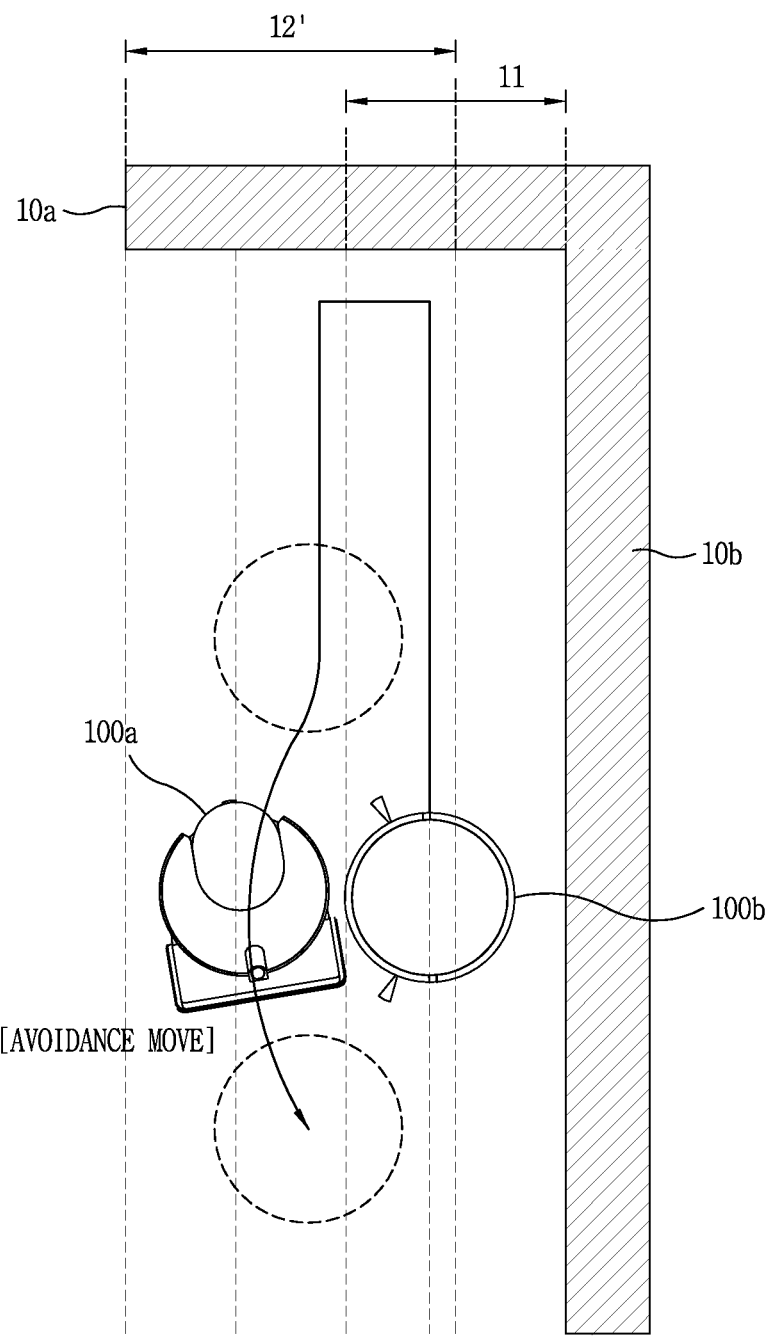

For example, in FIG. 10C, the controller of the first cleaner 100a moves while rotating and moving in a direction away from the second cleaner 100b and the second situation sensing object 10b. Then, the controller of the first cleaner 100a moves while aligning the front side of the first cleaner 100a toward the previous moving line, that is, the second line 12. Accordingly, it may be possible to carry out avoidance moving while drawing a parabolic shape.

Furthermore, in one example, while the first cleaner 100a performs avoidance moving to the second cleaner 100b, the controller of the first cleaner 100a may change the setting to move an extended second line 12', as illustrated in FIG. 10C. The extended second line 12' returns to a previous size again when the avoidance moving of the first cleaner 100a is ended.

At this time, the controller of the first cleaner 100a may control the moving unit to reduce the moving speed to perform avoidance moving.

In one example, while the first cleaner 100a performs avoidance moving as described above, the second cleaner 100b may perform a rotational motion that follows a trajectory corresponding to the avoidance moving of the first cleaner 100a. In other words, the controller of the second cleaner 100b may perform an in-place rotational motion such that the front side of the second cleaner 100b faces the center of the first cleaner 100a in an avoidance moving state. Through this, the positions of a movement trajectory of the first cleaner 100a is sensed in a sensing region of the second cleaner 100b.

Next, when a signal received from the second cleaner 100b is sensed at the rear side of the first cleaner 100a or a signal received from the first cleaner 100a is sensed at the front side of the second cleaner 100b with respect to the moving direction of the first cleaner 100a, avoidance moving based on the second signal is ended.

Now, the first cleaner 100a stops moving. Besides, the positions of a trajectory passed by the first cleaner 100a are followed one by one from the current position of the second cleaner 100b.

At this time, the controller of the first cleaner 100a or the controller of the second cleaner 100b may control the movement trajectory during the avoidance moving of the first cleaner 100a not to be followed.

Figure 10D:
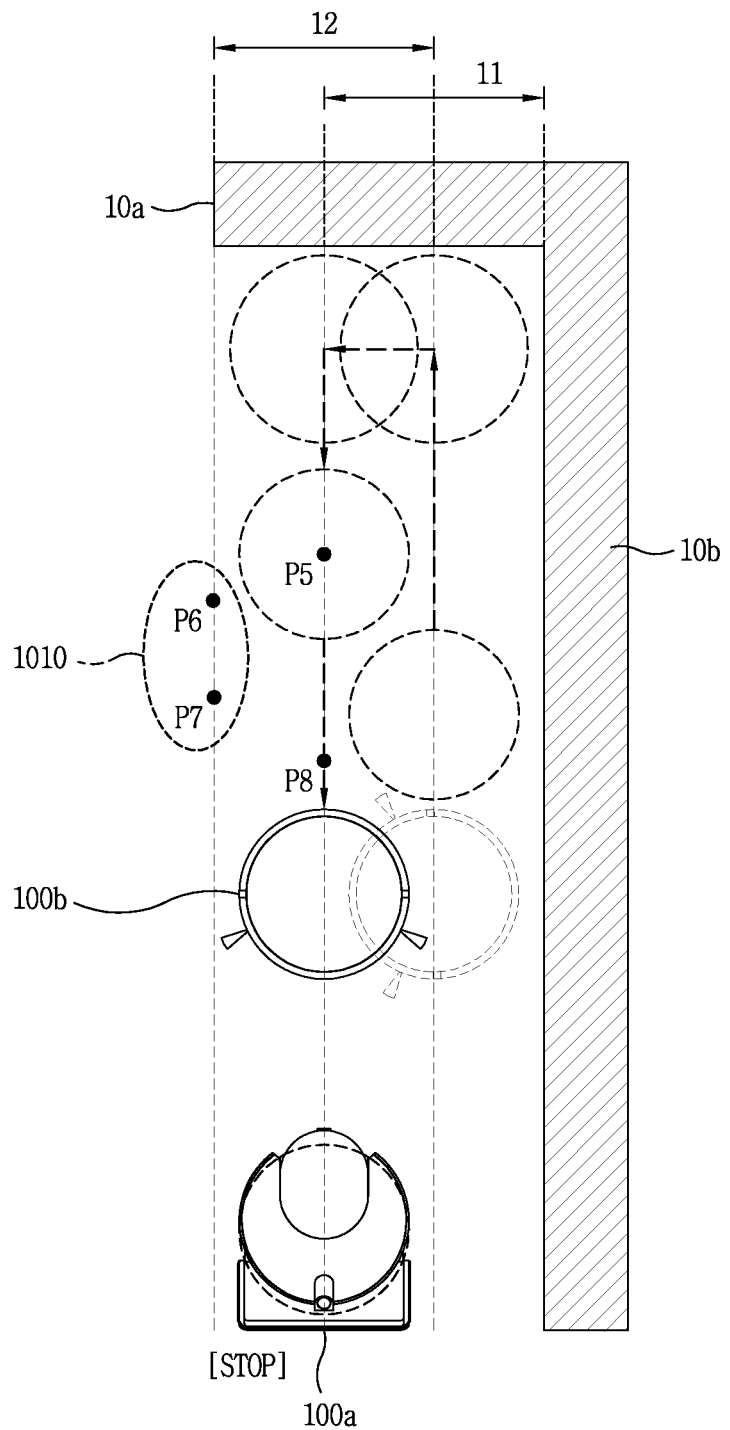

For example, in FIG. 10D, when the first cleaner 100a passes the points (P6, P7, P8) and the signal of the second cleaner 100b is sensed at the rear side of the first cleaner 100a as the first cleaner 100a transmits a first signal to the second cleaner 100b subsequent to the point (P5), and a second signal including an unavoidable state is received from the second cleaner 100b, a trajectory between the points P5 to P8, which is a trajectory according to the avoidance moving of the first cleaner 100a, is not followed.

The controller of the second cleaner 100b may delete the positions of a trajectory of the first cleaner 100a stored in the memory, i.e., points 1010 stored between the points P5 and P8 among the plurality of points, i.e., P6 and P7, without follow-up.

Alternatively, the deletion request may be carried out by the controller of the first cleaner 100a. For example, when the second cleaner 100b follows an outer edge of the situation sensing object 10a and then enters the second line 12 to come to the point P5, the controller of the first cleaner 100a may control such that the second cleaner 100b moves on the shortest path from the point P5 a point located at the end of avoidance moving, that is, the point P8.

Figure 10E:
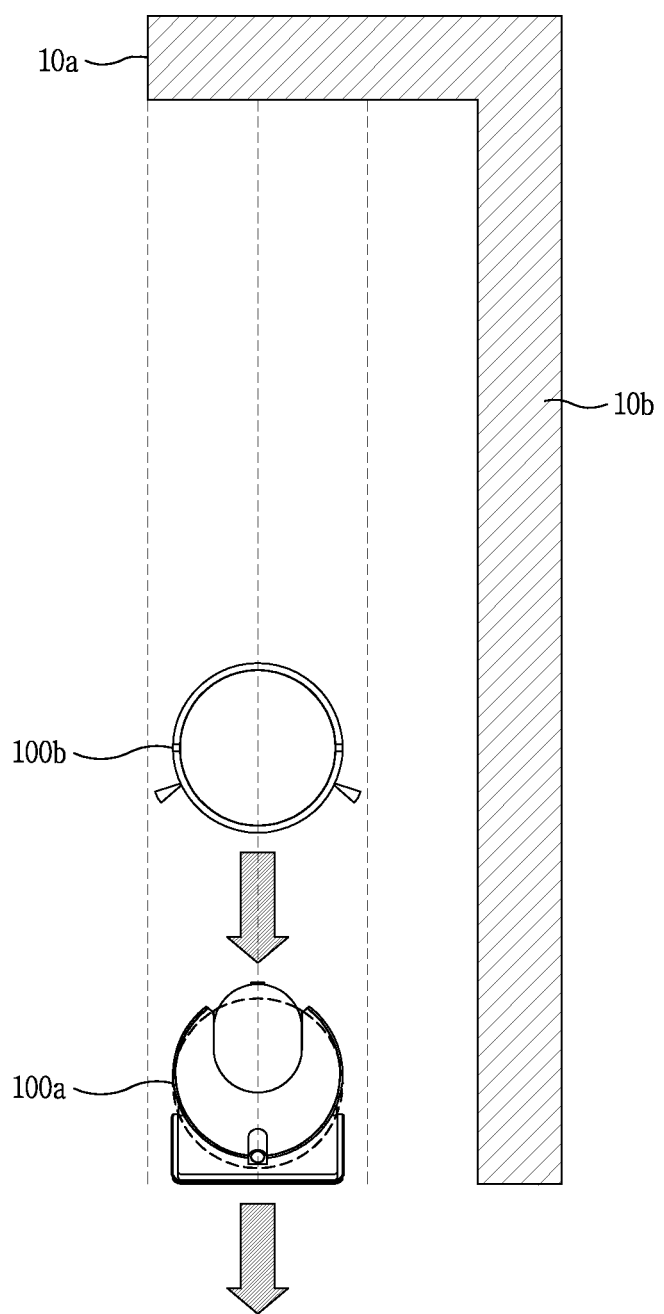

When the length of a trajectory to be followed (the shortest path from the point P5 to the point P8) decreases again to satisfy a predetermined follow-up distance range while the second cleaner 100b moves on the second line 12, as illustrated in FIG. 10E, the first cleaner 100a starts moving again, and the second cleaner 100b moves to follow the trajectory of the first cleaner 100a while satisfying a predetermined follow-up distance range.

For another embodiment, FIGS. 11A, 11B, 11C, 11D, 11E and 11F show examples of avoidance moving operations for allowing a follower cleaner to get out of a current moving path from the beginning when a head cleaner approaches the other cleaner according to a change of moving direction.

Figure 11A:
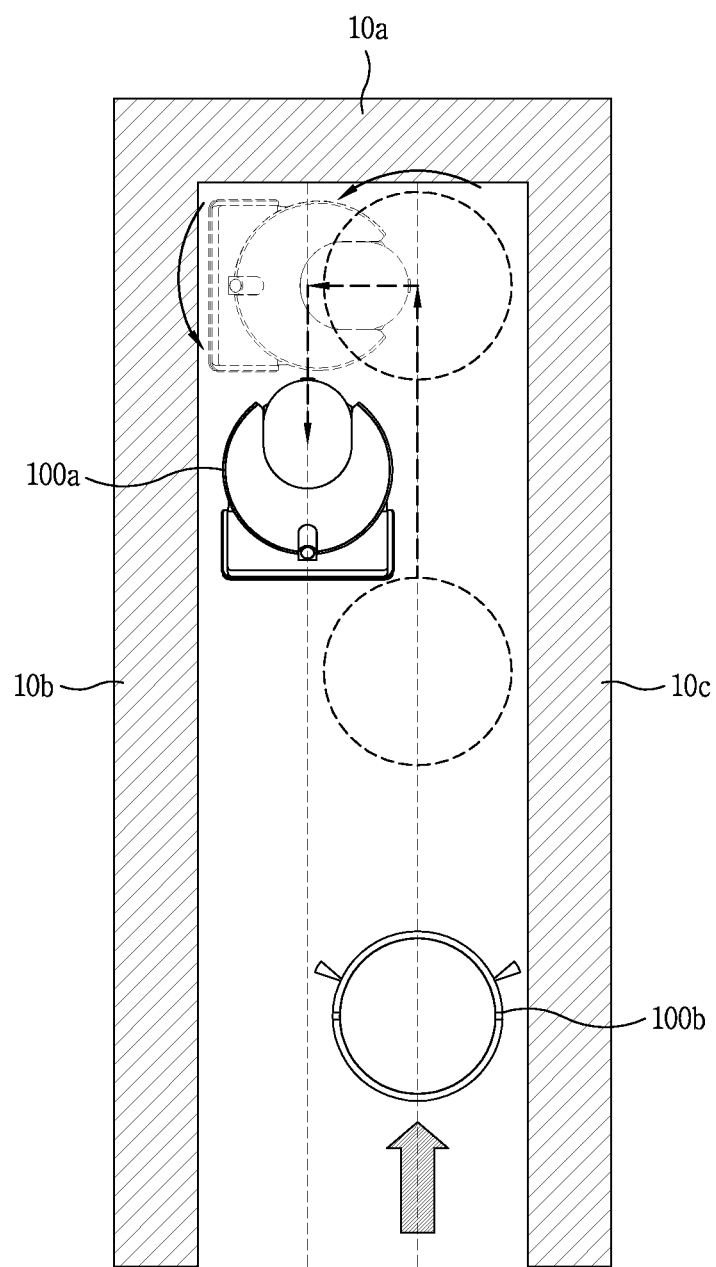
Figure 11B:
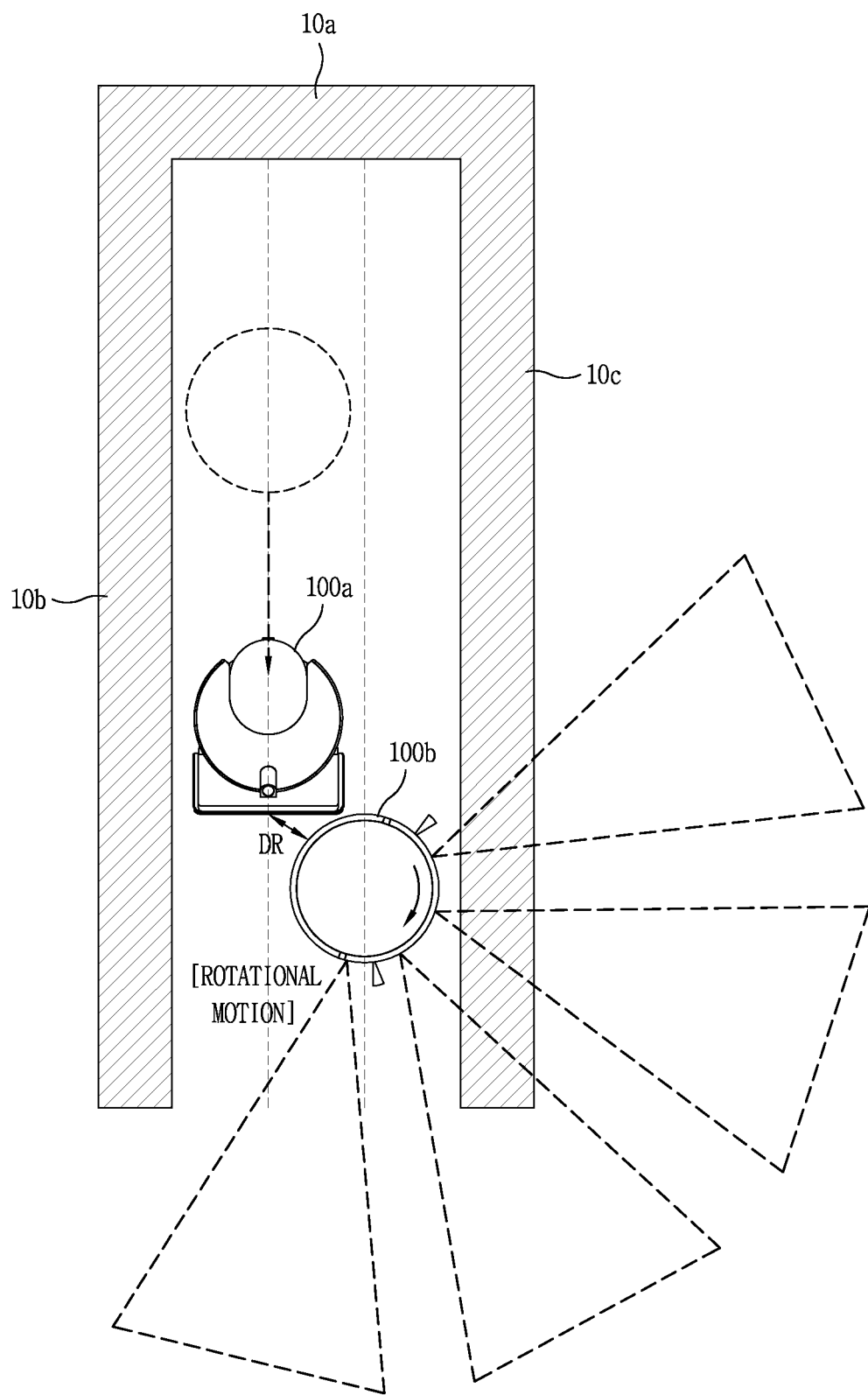

Referring to FIG. 11A, there is a case where the first cleaner 100a moves on a first line while sensing a third situation sensing object 10c on the right side, and senses a first situation sensing object 10a on the front side to enter a second line 12, and then a second situation sensing object 10b is present on the right side with respect to the changed moving direction.

In this case, when the first cleaner 100a approaches the second cleaner 100b moving on the first line to be closer thereto within a preset range, the controller of the first cleaner 100a reduces the current moving speed and transmits a first signal to the second cleaner 100b. The first signal may include a moving deceleration or stop command for the second cleaner 100b.

The second cleaner 100b that has received the first signal transmits a second signal indicating that it is in an unavoidable state. In other words, the controller of the second cleaner 100b may transmit a sensing signal of the third situation sensing object 10c as a response signal.

The controller of the first cleaner 100a may transmit a third signal in response to the second signal. At this time, the third signal includes a signal indicating an unavoidable state of the first cleaner 100a. In other words, the unavoidable state is a case where the first cleaner 100a must move by deviating from the second line 12 in a rightward direction to move while avoiding the second cleaner 100b, but a situation sensing object 10b is also sensed in the rightward direction to detect an unavoidable state even for the first cleaner 100a.

The controller of the first cleaner 100a controls the moving unit such that the first cleaner 100a stops moving in response to the detection of such an unavoidable state.

While the first cleaner 100a maintains a moving stop function, the controller of the second cleaner 100b may control to search for a position to move while performing a rotational motion until a situation sensing object is no longer sensed in front of the second cleaner 100b. For example, in FIG. 11B, the second cleaner 100b may perform a rotational motion that rotates by 180 degrees in a clockwise direction with respect to the current moving direction.

Then, the controller of the second cleaner 100b may control the moving unit to perform straight moving until the second cleaner 100b completely exits the first line overlapped with the second line.

Figure 11C:
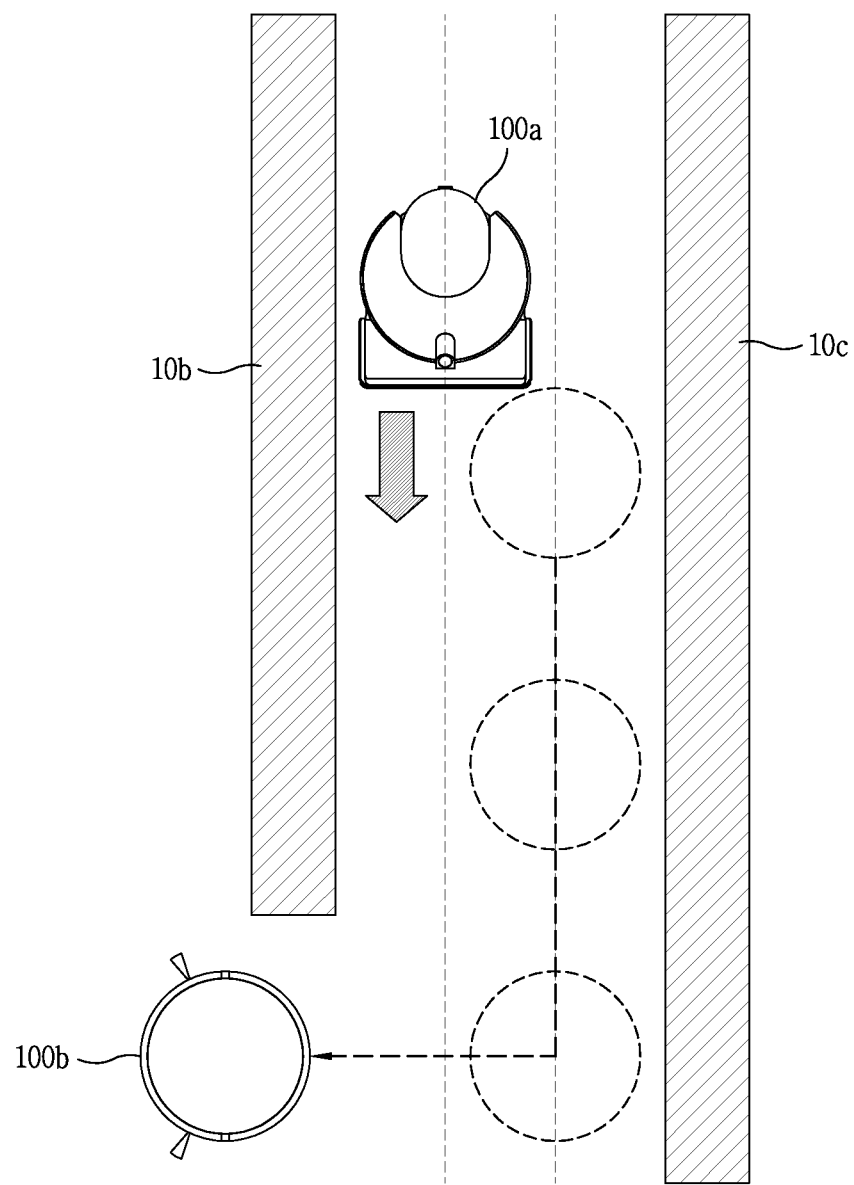

On the other hand, FIG. 11C illustrates a case where the first and second cleaners 100a, 100b enter a narrow region, but in case where the third situation sensing object 10c disappears in the middle, that is, when there are no situation sensing objects on the left and right sides of the sensing region of the second cleaner 100b, the second cleaner 100b may rotate and move to the left in the middle to exit the second line.

In FIG. 11C, the second cleaner 100b performs movement for avoidance moving when the separation distance is open above a predetermined value (e.g., about 55 to 60 cm) not to sense a situation sensing object even in either direction of the left and right sides while the second cleaner 100b moves straight on the first line.

For example, based on the third signal, the second cleaner 100b may control the moving unit to rotate by 90 degrees in a direction away from the first cleaner 100a and the third situation sensing object 10c, and then move to an avoidance point spaced apart from the center of the second line 12 by a predetermined separation distance. Here, the predetermined separation distance is a separation distance allowing the avoidance moving of the first cleaner 100a, and may be set to twice the radius of the cleaner.

Then, the controller of the second cleaner 100b aligns the front side of the second cleaner 100b toward a previous moving direction, that is, a first situation sensing object 10a. Furthermore, the controller of the first cleaner 100a may control the first cleaner 100a to move at a reduced speed along the second line during the avoidance moving of the second cleaner 100b or after the second cleaner 100b moves to the foregoing avoidance point.

At this time, since the front side of the second cleaner 100b is aligned toward the first situation sensing object 10a, the first cleaner 100a moves in a direction approaching the front side of the second cleaner 100b. Therefore, the positions of a trajectory corresponding to the avoidance moving of the first cleaner 100a may be continuously sensed and stored even while the second cleaner 100b stops at the avoidance point.

Figure 11D:
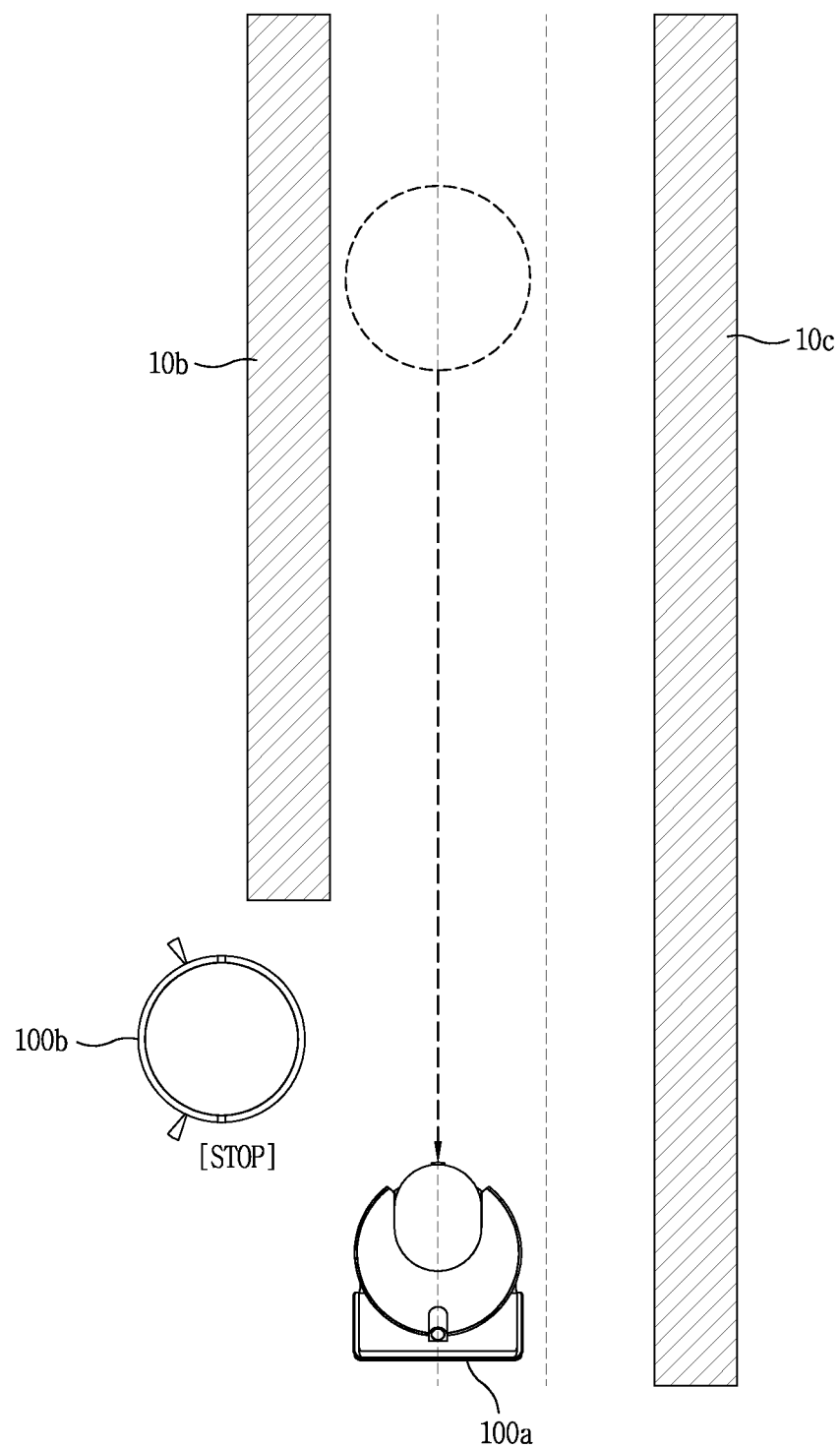

In FIG. 11D, the first cleaner 100a passes through the second cleaner 100b at the avoidance point as the first cleaner 100a moves straight on the second line, and the control of avoidance moving based on the second signal is ended when a signal emitted from the second cleaner 100b is sensed at the rear side of the first cleaner 100a.

Figure 11E:
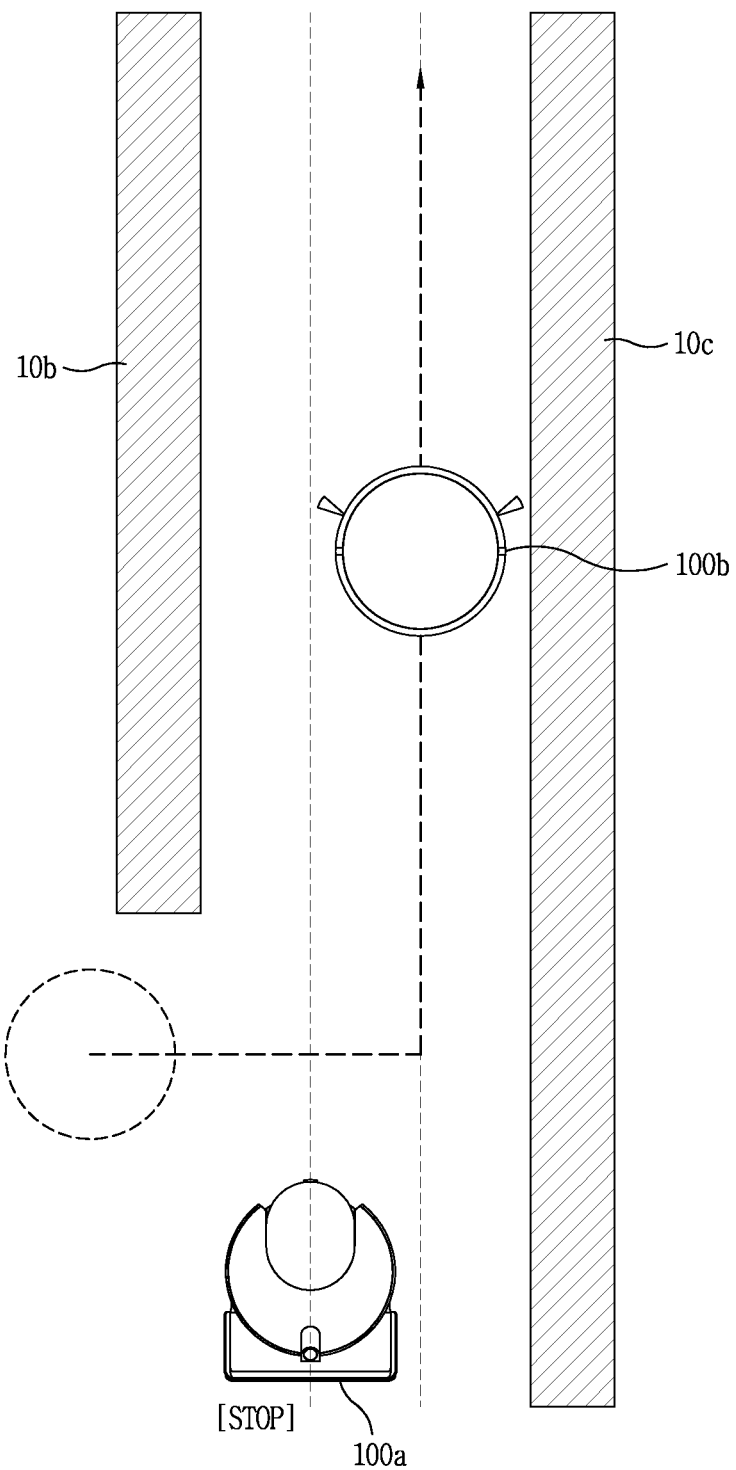
Figure 11F:
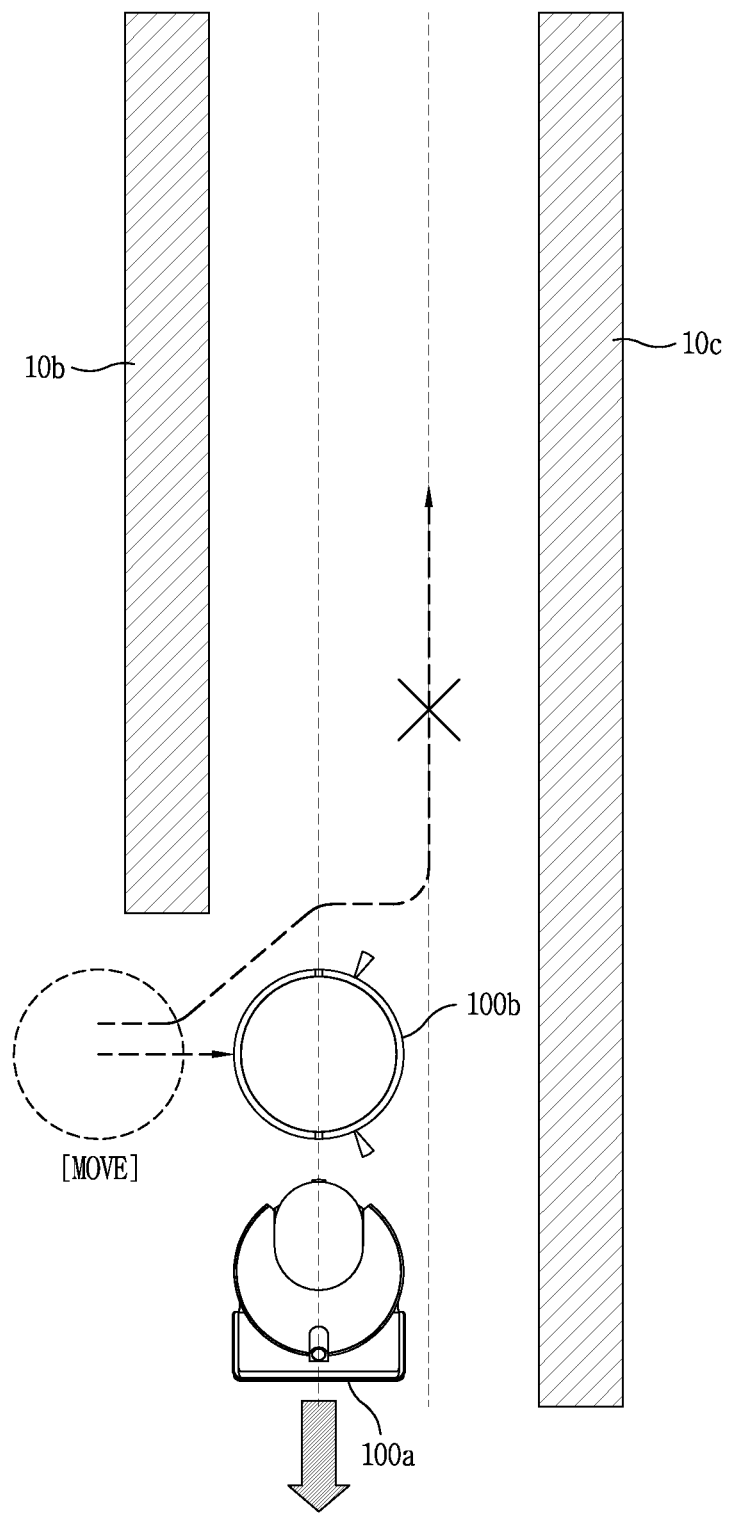

Then, the first cleaner 100a is in a moving stop state, and the second cleaner 100b may perform follow-up to the first cleaner 100a as either one of the embodiments of FIGS. 11E and 11F.

In one embodiment, as illustrated in FIG. 11E, the controller of the second cleaner 100b may return to a position prior to the execution of avoidance moving by the second cleaner 100b to follow the positions of the trajectory of the first cleaner 100a one by one. Accordingly, the second cleaner 100b faces the first situation sensing object 10a, changes the moving direction, enters the second line, and performs straight moving. When the length of the remaining trajectory satisfies a determined follow-up distance range, the first cleaner 100a starts moving again.

For another example, in order to reduce the cleaning time, the second cleaner 100b may be controlled not to enter a narrow region surrounded by the first to third situation sensing objects but to immediately enter the second line at the current position.

In this case, the controller of the second cleaner 100b rotates the front side of the second cleaner 100b by 90 degrees in a clockwise direction to face the second line, then enters the second line, and rotate it by 90 degrees in a clockwise direction again to face the center of the first cleaner 100a. At this time, the first cleaner 100a may immediately start moving without waiting for the second cleaner 100b. Furthermore, the controller of the second cleaner 100b deletes the positions of the trajectory of the first cleaner 100a from the memory in the meantime and then performs follow-up control using the position of the first cleaner 100a as a target trajectory.

Figure 12A:
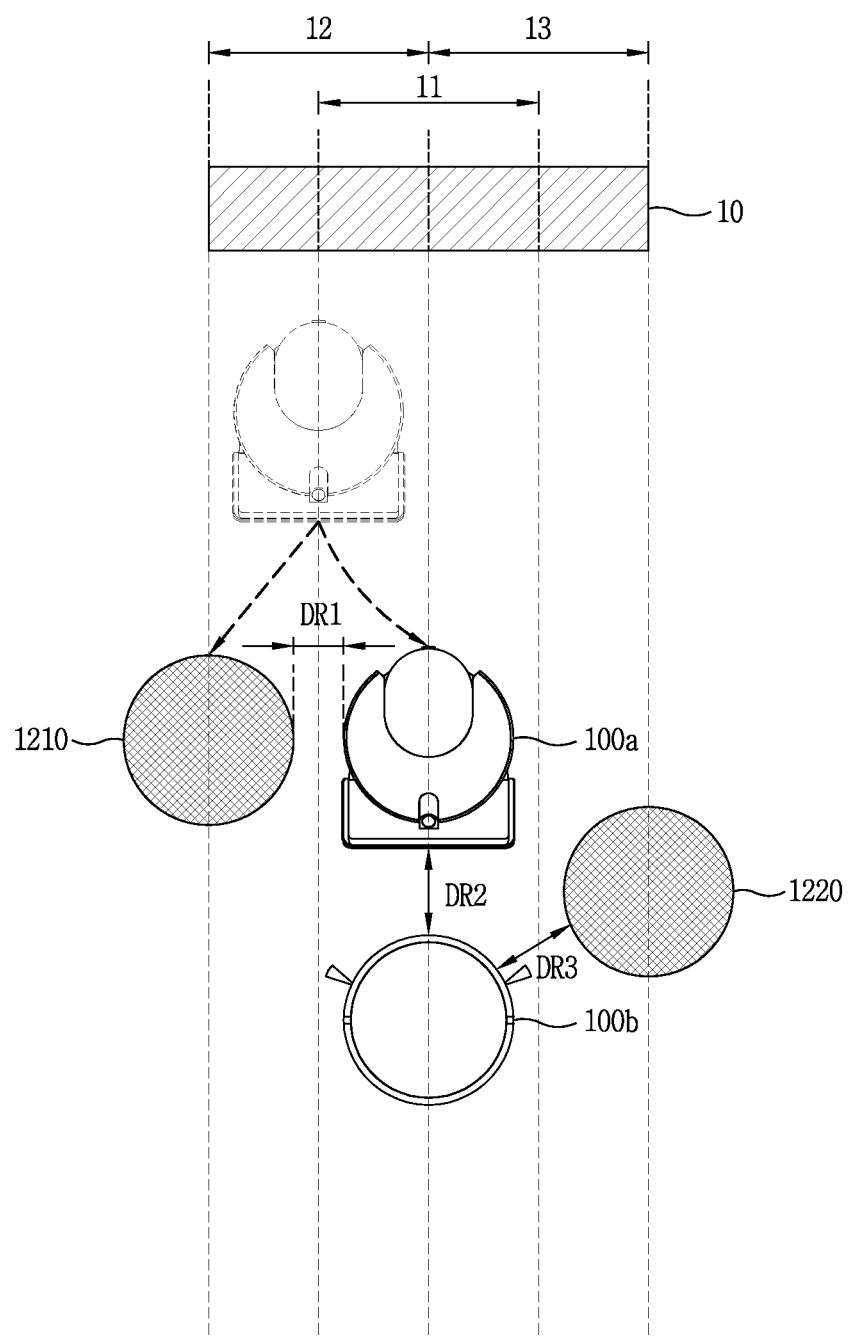
FIGS. 12A and 12B are conceptual views for explaining an example of an avoidance moving operation when a main body approaches another mobile robot and an obstacle at the same time according to a change in moving direction, in an embodiment of the present disclosure.
Figure 12B:
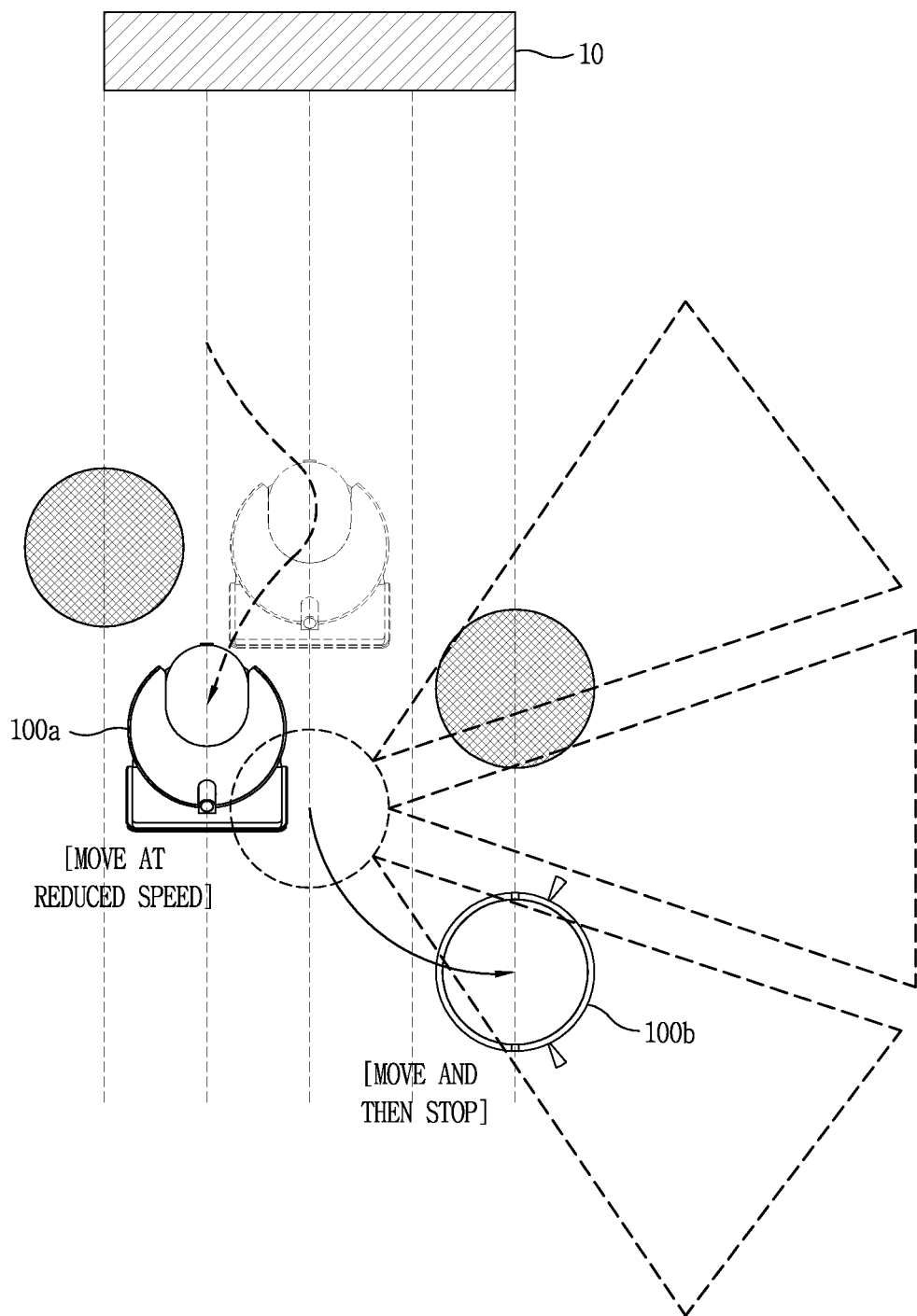

For another example, FIGS. 12A and 12B illustrate an example of an avoidance moving operation in case where a head cleaner approaches another cleaner and an obstacle at the same time according to a change of moving direction of the head cleaner.

Referring to FIG. 12A, it illustrates a case where the first cleaner 100a moving on the second line 12 senses a first obstacle (e.g., including a "fixed obstacle" and a "moving obstacle") 1210 prior to approaching the second cleaner 100b moving on the first line 11 to enter the first line by avoiding the first obstacle 1210.

Then, the first cleaner 100a approaches within a preset range (DR2) from the second cleaner 100b while following an outer edge of the first obstacle 1210 in a predetermined distance range (DR1). At this time, the first cleaner 100a must inform the second cleaner 100b of being in an unavoidable state, as well as performing avoidance moving to the first obstacle 1210.

Accordingly, the first cleaner 100a transmits a first signal to the second cleaner 100b while performing decelerated avoidance moving to the first obstacle 1210.

On the other hand, a case where the second cleaner 100b that has received the first signal senses a second obstacle (e.g., including a "fixed obstacle" or a "moving obstacle") 1220 existing within a predetermined distance range (DR3) corresponds to an unavoidable state.

Accordingly, the second cleaner 100b transmits a second signal indicating its own unavoidable state and avoidance moving to the second obstacle 1220 that must be carried out, and the first cleaner 100a stops at a current position for the time being according to the second signal. This is because the second cleaner 100b must first move to the avoidance point in order to control the avoidance moving between the first cleaner 100a and the second cleaner 100b.

Subsequent to the stopping of the first cleaner 100a, the second cleaner 100b performs a rotational motion (e.g., about 150 degrees) in a direction away from the first cleaner 100a and the second obstacle 1220 to move to an avoidance point away from the first cleaner 100a by a predetermined separation distance (e.g., about 55 to 60 cm). Then, the first cleaner 100a performs avoidance moving from the first obstacle 1210, and then performs avoidance moving in a direction away from the second obstacle 1220 to return to the second line.

Then, when it is sensed that the second cleaner 100b is located at the rear side of the first cleaner 100a, the second cleaner 100b may move along a path different from the trajectory of the first cleaner 100a while performing avoidance moving to the first obstacle 1210.

Figure 13A:
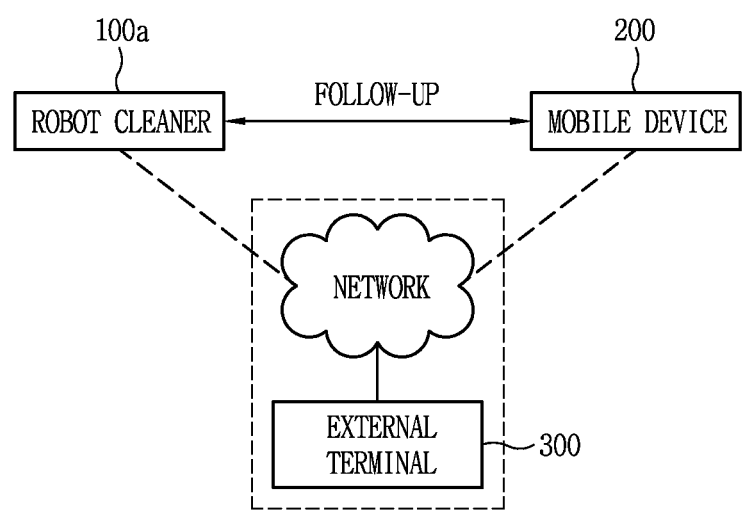
FIGS. 13A, 13B, and 13C are conceptual views showing various application examples of follow-up control between a first mobile robot and a second mobile robot according to the embodiments of the present disclosure.
Figure 13B:
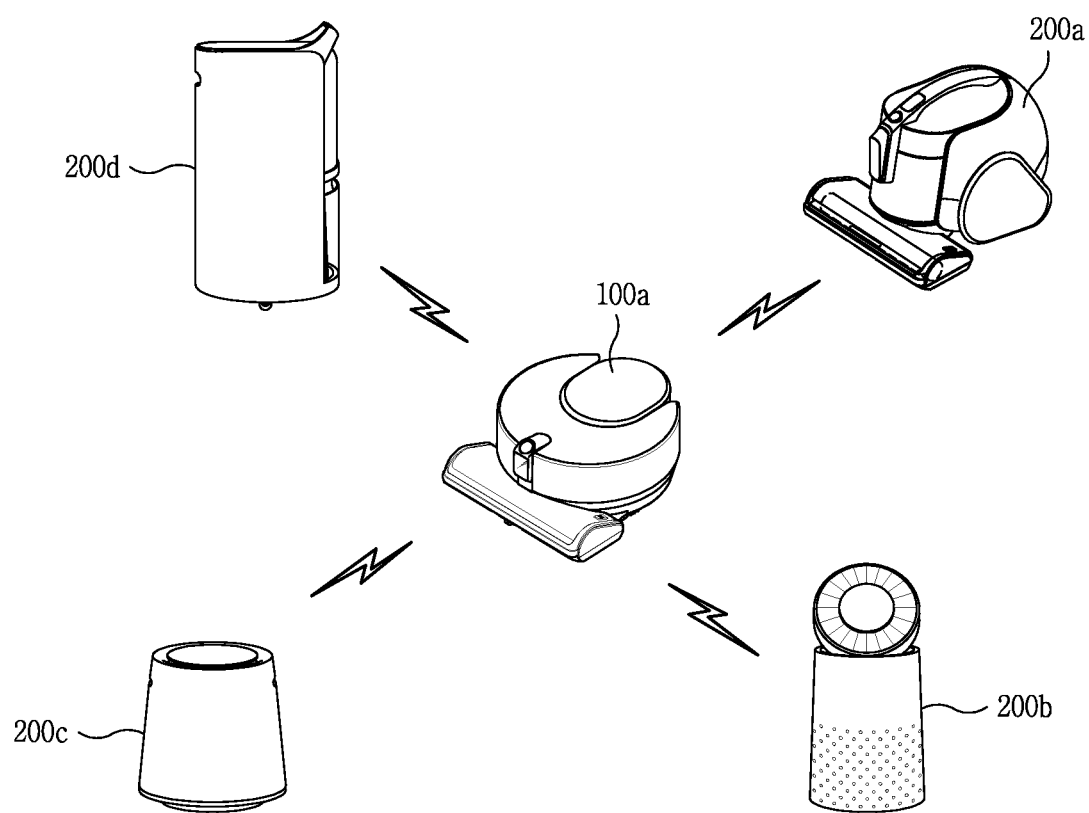
Figure 13C:
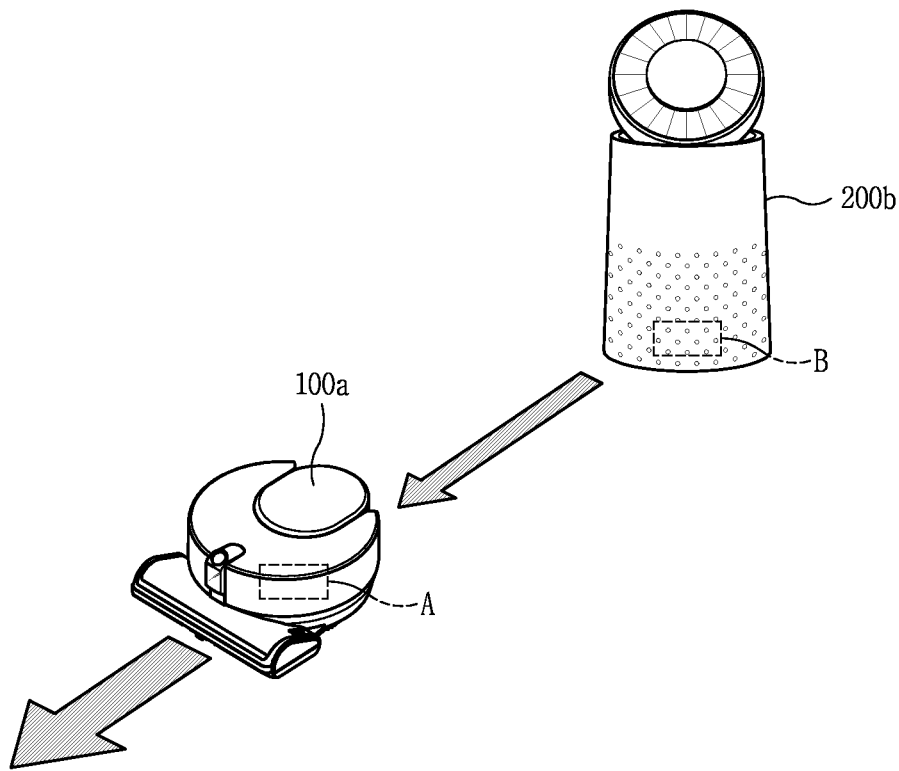

Hereinafter, FIGS. 13A, 13B, and 13C are modified examples of follow-up control between the first cleaner and the second cleaner in accordance with the foregoing embodiments of the present disclosure, and here, follow-up control between the first cleaner and a mobile device will be described in detail.

Here, the follow-up control disclosed herein means only that the mobile device follows a movement path of the first cleaner.

Referring to FIG. 13A, the first cleaner 100a may control the follow-up of a mobile device 200 by communicating with the mobile device 200 instead of the second cleaner.

Here, the mobile device 200 may not have a cleaning function, and may be any electronic device if it is provided with a driving function. For example, the mobile device 200 may include various types of home appliances or other electronic devices, such as a dehumidifier, a humidifier, an air purifier, an air conditioner, a smart TV, an artificial intelligent speaker, a digital photographing device, and the like, with no limit.

In addition, the mobile device 200 may be any device if it is equipped with a moving function, and may not have a navigation function for detecting an obstacle by itself or moving up to a predetermined destination.

The first cleaner 100a is a robot cleaner having both the navigation function and the obstacle detection function and can control the follow-up of the mobile device 200. The first cleaner 100a may be a dry cleaner or a wet cleaner.

The first cleaner 100a and the mobile device 200 can communicate with each other through a network (not shown), but may directly communicate with each other.

Here, the communication using the network is may be communication using, for example, WLAN, WPAN, Wi-Fi, Wi-Fi Direct, Digital Living Network Alliance (DLNA), Wireless Broadband (WiBro), World Interoperability for Microwave Access (WiMAX), etc. The mutual direct communication may be performed using, for example, UWB, Zigbee, Z-wave, Blue-Tooth, RFID, and Infrared Data Association (IrDA), and the like.

If the first cleaner 100a and the mobile device 200 are close to each other, the mobile device 200 may be set to follow the first cleaner 100a through a manipulation in the first cleaner 100a.

When the first cleaner 100a and the mobile device 200 are far away from each other, for example, the mobile device 200 may be set to follow the first cleaner 100a through a manipulation in an external terminal 300 (see FIG. 5A).

Specifically, follow-up relationship between the first cleaner 100a and the mobile device 200 may be established through network communication with the external terminal 300. Here, the external terminal 300 is an electronic device capable of performing wired or wireless communication, and may be a tablet, a smart phone, a notebook computer, or the like. At least one application related to follow-up control by the first cleaner 100a (hereinafter, "follow-up related application") may be installed in the external terminal 300. The user may execute the follow-up related application installed in the external terminal 300 to select and register the mobile device 200 subjected to the follow-up control by the first cleaner 100a. When the mobile device 200 subjected to the follow-up control is registered, the external terminal may recognize product information of the mobile device, and such product information may be provided to the first cleaner 100a via the network.

The external terminal 300 may recognize the position of the first cleaner 100a and the position of the registered mobile device 200 through communication with the first cleaner 100a and the registered mobile device 200. Afterwards, the first cleaner 100a may move toward the position of the registered mobile device 200 or the registered mobile device 200 may move toward the position of the first cleaner 100a according to a control signal transmitted from the external terminal 300. When it is detected that the relative positions of the first cleaner 100a and the registered mobile device 200 are within a predetermined following distance, the follow-up control for the mobile device 200 by the first cleaner 100a is started. After then, the follow-up control is performed by direct communication between the first cleaner 100a and the mobile device 200 without the intervention of the external terminal 300.

The setting of the follow-up control may be released by the operation of the external terminal 300 or automatically terminated as the first cleaner 100a and the mobile device 200 move away from the predetermined following distance.

The user can change, add or remove the mobile device 200 to be controlled by the first cleaner 100a by manipulating the first cleaner 100a or the external terminal 300. For example, referring to FIG. 13B, the first cleaner 100a may perform the follow-up control for at least one mobile device 200 of another cleaner 200a or 100b, an air purifier 200b, a humidifier 200c, and a dehumidifier 200d.

In general, since the mobile device 200 is different from the first cleaner 100a in its function, product size, and moving ability, it is difficult for the mobile device 200 to follow the movement path of the mobile terminal 100a as it is. For example, there may be an exceptional situation in which it is difficult for the mobile device 200 to follow the movement path of the first cleaner 100a according to a moving mode, a geographic feature of a space, a size of an obstacle, and the like. In consideration of such an exceptional situation, the mobile device 200 may move or wait by omitting a part of the movement path even if it recognizes the movement path of the first cleaner 100a. To this end, the first cleaner 100a may detect whether or not the exceptional situation occurs, and control the mobile device 200 to store data corresponding to the movement path of the first cleaner 100a in a memory or the like. Then, depending on situations, the first cleaner 100a may control the mobile device 200 to move with deleting part of the stored data or to wait in a stopped state.

FIG. 13C illustrates an example of a follow-up control between the first cleaner 100a and the mobile device 200, for example, the air cleaner 200b having a moving function. The first cleaner 100a and the air purifier 200b may include communication modules A and B for determining relative positions thereof, respectively. The communication modules A and B may be one of modules for emitting and receiving an IR signal, an ultrasonic signal, a carrier frequency, or an impulse signal. The recognition of the relative positions through the communication modules A and B has been described above in detail, so a description thereof will be omitted. The air purifier 200b may receive moving information corresponding to a moving command (e.g., changes in moving including a moving direction and a moving speed, moving stop, etc.) from the first cleaner 100a, move according to the received moving information, and perform air purification. Accordingly, the air purification may be performed in real time with respect to a cleaning space in which the first cleaner 100a operates. In addition, since the first cleaner 100a has already recognized the production information related to the mobile device 200, the first cleaner 100a can control the air purifier 200b to record the moving information of the first cleaner 100a, and move with deleting part of the moving information or wait in a stopped state.

As described above, according to a robot cleaner and a control method thereof according to an embodiment of the present disclosure, the following cleaner may perform cleaning without any interruption while following the leading cleaner without through a server. Furthermore, follow-up moving of the follower cleaner may be controlled on the basis of a length of a trajectory to be actually followed by the follower cleaner during follow-up of a plurality of robot cleaners thereby performing efficient follow-up control without collision or delay even in an exceptional situation where the moving directions of the head cleaner and the follower cleaner are different or they should avoid each other, and a control method thereof. In addition, when the length of the trajectory to be followed by the follower cleaner decreases, the movement speed of the follower cleaner may be reduced or the trajectory of the head cleaner may be followed in place, and when the length of the trajectory to be followed by the follower cleaner increases, the movement speed of the head cleaner decreases or stops, thereby performing visually stable follow-up control while the follower cleaner follows the head cleaner without missing it. Besides, during follow-up of a plurality of robot cleaners, even when the head cleaner changes its current moving direction, collision and error-free avoiding design with the follower cleaner may be allowed, thereby allowing visually stable follow-up control. Moreover, even when the head cleaner changes its moving direction and is temporarily located behind the follower cleaner, it may be possible to continuously perform efficient follow-up without any interference of the following cleaner through an optimal avoidance design.

The present disclosure described above may be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 1800. The above detailed description should not be limitedly construed in all aspects and should be considered as illustrative. The scope of the present invention should be determined by rational interpretation of the appended claims, and all changes within the scope of equivalents of the present invention are included in the scope of the present disclosure.

What is the claimed is:

1. A cleaning system including a plurality of mobile robots, the cleaning system comprising:
   a driving unit configured to move a main body of a first mobile robot;

a communication unit configured to communicate with a second mobile robot; and
a controller configured to:
recognize the location of the second mobile robot using a second signal emitted by the second mobile robot;
control a moving speed of the main body such that the second mobile robot follows a trajectory corresponding to the movement of the main body based on the recognized location;
transmit a first signal to the second mobile robot in response to the main body approaching the second mobile robot in a first direction to within a distance less than a first threshold distance to the second mobile robot; and
control avoidance moving of the main body and the second mobile robot based on the second signal of the second mobile robot emitted in response to the first signal,
wherein the controller is further configured to carry out the avoidance moving based on the second signal when the main body moves in a direction away from the second mobile robot subsequent to the movement of the second mobile robot and end the avoidance moving at a time when a signal emitted from the second mobile robot is sensed at a rear side of the main body relative to the direction of movement of the main body.

2. The cleaning system according to claim 1, wherein the controller is configured to transmit the first signal while reducing a moving speed of the main body when the main body approaches the second mobile robot to within the distance less than the first threshold distance.

3. The cleaning system according to claim 1, wherein the controller is configured to output a control command to stop the moving of the main body while the second mobile robot moves away from the main body based on the second signal.

4. The cleaning system according to claim 1, wherein the controller is configured to reduce the moving speed of the main body according to the first signal, and maintain the reduced moving speed while the second mobile robot moves away from the main body based on the second signal.

5. The cleaning system according to claim 1, wherein the controller is further configured to output a control command to stop the moving of the main body when the avoidance moving is ended, and the second mobile robot follows a trajectory corresponding to the movement of the main body prior to the avoidance moving.

6. The cleaning system according to claim 1, wherein the controller is further configured to control the second mobile robot to perform a rotational motion based on the second signal, and output a control command to stop the moving of the main body while the rotational motion is carried out.

7. The cleaning system according to claim 1, wherein the controller is further configured to control the driving unit such that the main body moves without deviating from a current moving path in response to whether the second mobile robot has moved away from the main body during the avoidance moving.

8. The cleaning system according to claim 1, wherein the controller is further configured to control the avoidance moving such that the main body moves in a direction away from the second mobile robot in response to whether information indicating an unavoidable state of the second mobile robot is included in the second signal.

9. The cleaning system according to claim 1, wherein the controller is configured to restrict the second mobile robot from following a trajectory corresponding to the avoidance moving of the main body based on the second signal when the main body performs avoidance moving away from the second mobile robot based on the second signal.

10. The cleaning system according to claim 1, wherein the controller is configured to control the second mobile robot to perform a rotational motion for following a trajectory corresponding to the movement of the main body at a current location during avoidance moving when the main body performs avoidance moving away from the second mobile robot based on the second signal.

11. The cleaning system according to claim 1, wherein the controller is configured to stop the moving of the main body in response to whether information indicating an unavoidable state of the second mobile robot is included in the second signal, and control the second mobile robot to move a current moving path while controlling the second mobile robot to move in a direction away from the main body until moving out of the moving path of the main body.

12. A method of controlling a plurality of mobile robots, the method comprising:
moving a first mobile robot;
receiving a second signal at the first mobile robot, the second signal being emitted by a second mobile robot such that the first mobile robot recognizes the location of the second mobile robot;
controlling the second mobile robot to follow and move in a trajectory corresponding to the movement of the first mobile robot based on the recognized location of the second mobile robot;
controlling the first mobile robot to transmit a first signal to the second mobile robot in response to the first mobile robot approaching the second mobile robot in a first direction to within a distance less than a first threshold distance from the second mobile robot; and
controlling avoidance moving of the first mobile robot and the second mobile robot based on the second signal of the second mobile robot emitted in response to the first signal,
wherein said controlling the avoidance moving comprises moving the first mobile robot in a direction away from the second mobile robot subsequent to the movement of the second mobile robot and ends at a time when a signal emitted from the second mobile robot is sensed at a rear side of the first mobile robot relative to the direction of movement of the first mobile robot.

13. The method of claim 12, wherein the method further includes transmitting the first signal while reducing a moving speed of the first mobile robot when the first mobile robot approaches the second mobile robot to within the distance less than the first threshold distance.

14. The method of claim 12, wherein said controlling the avoidance moving comprises outputting a control command to stop the moving of the first mobile robot while the second mobile robot moves away from the first mobile robot based on the second signal.

15. The method of claim 12, wherein said controlling the avoidance moving comprises reducing the moving speed of the first mobile robot according to the first signal, and maintaining the reduced moving speed of the first mobile robot while the second mobile robot moves away from the first mobile robot based on the second signal.

16. The method of claim 12, further comprising:
outputting a control command to stop the moving of the first mobile robot such that the second mobile robot follows a trajectory corresponding to the movement of the first mobile robot prior to the avoidance moving when the avoidance moving based on the second signal ends.

17. A cleaning system including a plurality of mobile robots, the cleaning system comprising:
- a driving unit configured to move a main body of a first mobile robot;
- a communication unit configured to communicate with a second mobile robot; and
- a controller configured to:
  - recognize the location of the second mobile robot using a second signal emitted by the second mobile robot;
  - control a moving speed of the main body such that the second mobile robot follows a trajectory corresponding to the movement of the main body based on the recognized location;
  - transmit a first signal to the second mobile robot in response to the main body approaching the second mobile robot in a first direction to within a distance less than a first threshold distance to the second mobile robot; and
  - control avoidance moving of the main body and the second mobile robot based on the second signal of the second mobile robot emitted in response to the first signal,
  - wherein the controller is further configured to control the second mobile robot to follow the trajectory corresponding to the movement of the main body while a length of the trajectory satisfies a determined follow-up distance range, wherein the determined follow-up distance range is a distance range between a first distance and a second distance, wherein the second distance is longer than the first distance.

* * * * *